(12) United States Patent
Angele et al.

(10) Patent No.: US 7,352,346 B2
(45) Date of Patent: Apr. 1, 2008

(54) BISTABLE LIQUID CRYSTAL DISPLAY DEVICE INCLUDING IMPROVED ADDRESSING MEANS

(75) Inventors: Jacques Angele, Malakoff (FR); Romain Vercelletto, Ably (FR); Thierry Elbhar, Ably (FR)

(73) Assignee: Nemoptic (FR)

( * ) Notice: Subject to any disclaimer, the term of this patent is extended or adjusted under 35 U.S.C. 154(b) by 550 days.

(21) Appl. No.: 10/511,833

(22) PCT Filed: Apr. 17, 2003

(86) PCT No.: PCT/FR03/01240

§ 371 (c)(1),
(2), (4) Date: Oct. 19, 2004

(87) PCT Pub. No.: WO03/090197

PCT Pub. Date: Oct. 30, 2003

(65) Prior Publication Data

US 2007/0013860 A1    Jan. 18, 2007

(30) Foreign Application Priority Data

Apr. 19, 2002    (FR) ................................. 02 04940

(51) Int. Cl.
*G09G 3/36* (2006.01)
(52) U.S. Cl. ......................... 345/87; 345/30
(58) Field of Classification Search .......... 345/87–102, 345/177, 30
See application file for complete search history.

(56) References Cited

U.S. PATENT DOCUMENTS

| 5,420,604 | A | | 5/1995 | Scheffer et al. |
|---|---|---|---|---|
| 5,900,852 | A | * | 5/1999 | Tanaka et al. ................. 345/87 |
| 6,057,817 | A | * | 5/2000 | Ono et al. ..................... 345/94 |
| 6,154,190 | A | | 11/2000 | Yang et al. |
| 6,327,017 | B2 | * | 12/2001 | Barberi et al. .............. 349/177 |

FOREIGN PATENT DOCUMENTS

| FR | 2 740 894 A1 | 5/1997 |
|---|---|---|
| FR | 2 835 644 A1 | 8/2003 |
| WO | WO-00/74030 A1 | 12/2000 |

OTHER PUBLICATIONS

Dozov et al., "Nemoptic's Bistable Nematic Liquid-Crystal Technology", Information Display, pp. 10-12, Jan. 2002.
Alt et al., "Scanning Limitations of Liquid-Crystal Displays", IEEE Transactions On electron Devices, vol. 21, No. 2, pp. 146-155, Feb. 1974.

(Continued)

*Primary Examiner*—Alexander Eisen
*Assistant Examiner*—Christopher E Leiby
(74) *Attorney, Agent, or Firm*—Lerner, David, Littenberg, Krumholz & Mentlik, LLP

(57) ABSTRACT

A method of electrically addressing a matrix screen of bistable nematic liquid crystals with breaking of anchoring is disclosed. Controlled electrical signals are applied respectively to row electrodes and to column electrodes of the screen. A plurality of rows are simultaneously addressed using similar row signals that are offset in time by a duration greater than or equal to the time column voltages that are applied. The row addressing signals have, in a first period, at least one voltage value serving to break the anchoring of all of the pixels in the row. This is followed by a second period that enables the final states of the pixels making up the address row to be determined. The final states are a function of the value of each of the electrical signals applied to the corresponding columns.

64 Claims, 20 Drawing Sheets

OTHER PUBLICATIONS

Giocondo et al., "Write and erase mechanism of surface controlled bistable nematic pixel", The European Physical Journal Applied Physics, vol. 5, pp. 227-230, 1999.

Dov, "16.1:Recent Improvements of Bistable Nematic Displays Switched By Anchoring Breaking (BiNem)", SID 01 Digest, pp. 224-227, 2001.

* cited by examiner

Pixel switching signals
Write signals: switching to the twisted texture T
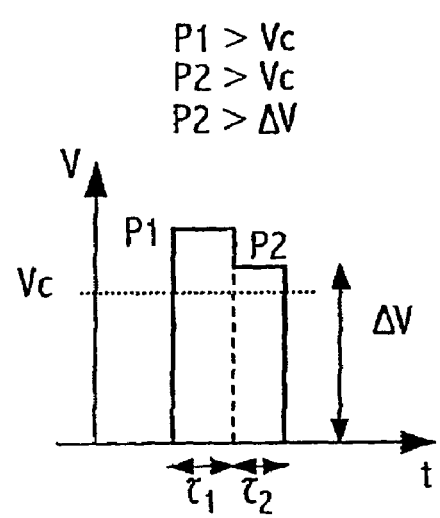
FIG.3a1
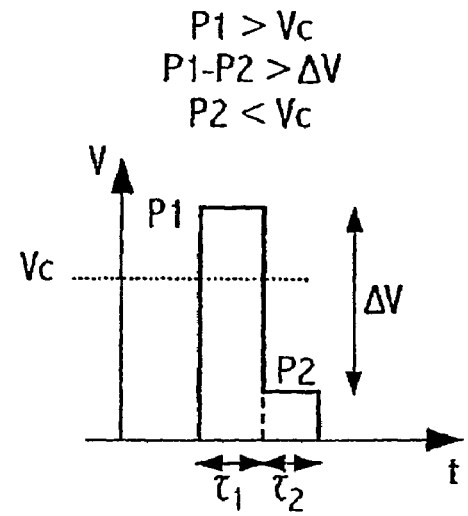
FIG.3a2
Delete signals: switching to the uniform texture U
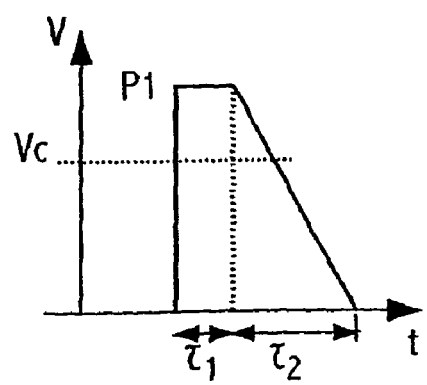
Slow drop by ramp
FIG.3b1
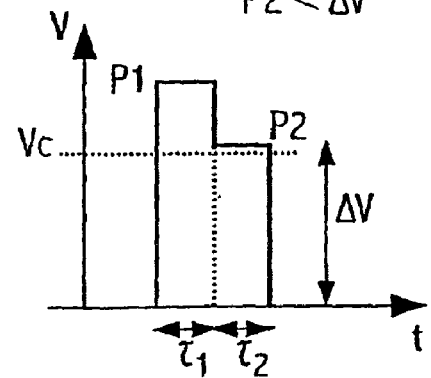
Slow drop by staircase
Two plateaus
FIG.3b2

Writing or deleting as a function of the value of the second plateau across the pixel terminals and corresponding to the electrooptical curve of Fiigure 4

Signals applied to the electrodes

Row signal

Column delete signal

Column write signal

DELETE PIXEL

WRITE PIXEL

Column signal waveform - Example 1
Column signal in the form of squarewave pulses Row signal Column delete signal Column write signal

DELETE PIXEL

WRITE PIXEL

Column signal waveform - Example 2 - Illustration 1

Column signal in the form of ramps

Row signal

Column delete signal

Column write signal

DELETE PIXEL

WRITE PIXEL

Column signal waveform - Example 2 - Illustration 2

Column signal in the form of two plateaus

Row signal

Column delete signal

Column write signal

DELETE PIXEL

WRITE PIXEL

Symmetrical signals of constant polarity and reduced excursion

Row N FIG.12a

Row N+1 FIG.12b

Column M FIG.12c

Delete pixel M,N FIG.12d

Write pixel M,N+1 FIG.12e

The 5 row signal levels are: 0 ; (P2I-P2E)/2 ; (p2I+P2E)/2 ; P2I ; P1.
The 5 column signal levels are 0 ; (P2I-P2E) ; P2E ; P2I ; P1.
The pixel voltages are: 0 ; ±(P2I-P2E)/2 ; ±P2E ; ±P2I ; ±P1.
The rms interfering signal is: $\tau_2(P2I-P2E)^2/4(\tau_1+\tau_2)$.

Example of row pulse waveform for addressing a BiNem screen with time overlap of row address pulses
3 plateau row signal during anchoring breaking stage C

Example of row pulse waveform for addressing a BiNem screen with time overlap of row address pulses
5 plateau row signal during anchoring breaking stage C

BISTABLE LIQUID CRYSTAL DISPLAY DEVICE INCLUDING IMPROVED ADDRESSING MEANS

CROSS REFERENCE TO RELATED APPLICATIONS

The present application is the National Stage of International Application No. PCT/FR03/01240, filed on Apr. 17, 2003.

BACKGROUND OF THE INVENTION

The present invention relates to the field of liquid crystal display devices, and more precisely to a method and a device for controlling the switching between two states of a multiplexed bistable nematic display.

Addressing a Passive Liquid Crystal Display of the STN Type

The abbreviation STN stands for "super twisted nematic". It relates to displays having super-twisted molecule structure.

The Principle of Multiplexing—and its Limitations

Passive screens capable of displaying a large number of rows (e.g. STN technology makes it possible to obtain up to about 500 rows) use an addressing technique known as multiplexing.

With a matrix screen of medium resolution, the person skilled in the art knows that there is no question of individually connecting each pixel to an independent control electrode, since that would require one connection per pixel which is technologically impossible as soon as the screen becomes complex. It is possible to save on connections by making use of the multiplexing technique when the electro-optical effect used is non-linear, as applies to the usual liquid crystal techniques known as twisted nematic (TN) and super twisted nematic (STN). Each pixel is constituted by the intersection between a row electrode and a column electrode. The pixels are arranged in a matrix system with $n$ groups each having $m$ pixels. For example, there are $n$ rows and $m$ columns for matrix screens or $n$ digits and $m$ digit portions for digit displays. In sequential addressing mode, which is the mode that is in most widespread use, a single row is selected at a time. While a row is selected, column signals are applied simultaneously to all of the pixels in the row, and then the technique moves on to the following row, and so on, down to the last row. The frequency at which each row is refreshed electrically must be high enough to obtain good visual characteristics for the displayed image (about 50 times per second).

The time required for addressing the image is equal to the time required for addressing one row multiplied by the number of rows $n$. With that method, a mere m+n connections suffice for addressing a screen of m×n pixels, where $m$ is the number of columns in the matrix in question. A multiplexed matrix screen is shown in FIG. 1.

The signal to which the pixel is subjected is the difference between the signal applied to the row and the signal applied to the column for which the pixel occupies the intersection.

The type of screen as shown in FIG. 1 is said to be a "passive screen": it does not include active elements enabling the pixels to be electrically isolated from one another. A row electrode is common to all of the pixels of the row and a column electrode is common to all of the pixels of the column, without there being any active element (e.g. a transistor). As a result, passive screens are much simpler to manufacture than are active screens which include one transistor or one diode per pixel.

The drawback of multiplexing is that a pixel is addressed by column signals throughout the time the image is being addressed, and not only while its own row is being activated. That is to say, while the image is being written, a pixel on the screen receives in succession the column signals for its entire column. It can be assumed that the signals applied to the pixel outside the time during which its row is selected act as interfering signals that have an effect on the electro-optical response of the liquid crystal pixel. More precisely, for passive matrices of the TN, STN, or similar type, the state of the liquid crystal in a pixel depends almost exclusively only on the root mean square (rms) value of the voltage which is applied thereto during the image addressing time, under the usual operating conditions. As a result, the final state of the liquid crystal molecules, which means essentially the optical transmission state of the pixel, is determined by the rms voltage applied during the image addressing time. Optimizing row and column signals leads to the Alt and Plesko criterion (Alt, P. M., et al., *IEEE Trans Electron Devices, ED* 21: pp 146-155) which puts a practical limit on the number of rows a screen can have.

One of the principles limiting sequential addressing by one row at a time is that the voltage applied to a given pixel passes through a very clearly marked maximum each time its row is selected. The liquid crystal of the pixel then presents an instantaneous response characterized by relaxing between two occasions on which the row is addressed, i.e. between two consecutive frames. This leads to a high level of flicker and to an apparent loss of contrast. This effect is commonly referred to as "frame response". To limit this effect, it is necessary to select a liquid crystal having a response time that is slow, to the detriment of the speed performance of the display.

Reduction of the "Frame Response" Effect by Multi-Line Addressing (MLA)

U.S. Pat. No. 5,420,604 proposes a novel addressing technique for an STN screen characterized by selecting a plurality of rows simultaneously (referred to as MLA or MLS for multi-line selection). That method relates solely to passive screens in which the optical response of the liquid crystal is a function mainly of the applied rms voltage.

By addressing a plurality of rows simultaneously, it is possible to reduce the "frame response" effect considerably, since during the frame time, the row receives not only one, but a plurality of selection pulses. It is then possible to use a liquid crystal having a fast response time.

Implementing MLA requires row selection signals to be generated that are "normalized and orthogonal", and sometimes requires an image memory to be incorporated in the screen driver circuit. That leads to control electronics of greater expense.

Reference can usefully be made to the above-mentioned document in order to understand the kind of signals required. The term "normalized" means that the row selection signals must be normalized so that they all possess the same rms value. The term "orthogonal" means that the row selection signals must be adapted so that multiplying any one of the row selection signals by the signal for a distinct row gives a signal in which the integral over the frame period is zero.

Addressing a Bistable LCD of the Cholesteric Type (Planar-conical Focus Transition)

PCT Patent No. WO 00/74030 describes a method of addressing a plurality of rows simultaneously applied to a screen using a bistable liquid crystal having a chiral component (of the cholesteric type). In that document, rows that are addressed simultaneously must be addressed by signals that are mutually orthogonal. It is necessary to control accurately the rms voltage applied to the pixel during some of the four addressing stages of a screen based on a cholesteric liquid crystal-based screen. The use of orthogonal signals for addressing the row enables the voltages to be controlled effectively.

Description of the Bistable Screen (FIG. 2)

Recently, a new bistable display has been proposed and is described in French Patent No. 96/04447.

It is constituted by a cholesteric or chiralized nematic liquid crystal layer between two plates or substrates, at least one of which is transparent. Two electrodes are disposed on the respective substrates and serve to apply electrical control signals to the chiralized nematic liquid crystal situated between them. On the electrodes, anchor layers orient the liquid crystal molecules in desired directions. On a master plate, molecules are anchored strongly with a slight incline, while on the slave plate, anchoring is weak and flat. The anchoring of the molecules to these surfaces is monostable.

The device also includes an optical system.

The two bistable textures U (uniform or weakly twisted) and T (twisted) of the liquid crystal are stable without an applied electric field. This is obtained for a zero or small angle between the anchor direction on the master plate and on the slave plate. The twists of the two textures differ in absolute value by about 180°. The spontaneous pitch $p_0$ of the nematic is selected to be close to four times the thickness $\underline{d}$ of the cell ($p_0 \approx 4 \cdot d$) in order to ensure that the energies of the textures U and T are essentially equal. With no applied field, there exists no other state with lower energy: U and T are genuinely bistable.

Switching from One Texture to the Other by Breaking the Anchoring

Physical Principle

The two bistable textures are topologically distinct, and it is not possible to transform one into the other by continuous volume distortion. Transformation from texture U to texture T, or vice versa, therefore requires either anchoring on the surfaces to be broken, as is induced by a strong external field, or else a disinclination line to be displaced. This second phenomenon which is much slower than the first can be ignored and is not described in detail below.

Any liquid crystal alignment layer can be characterized by zenithal anchoring energy Az. This energy is always finite. It can be seen shown that there then exists a threshold field $E_c$ that is also finite (threshold for breaking the anchoring), which gives a homeotropic texture (H) at the surface regardless of the preceding texture with no applied field.

Breaking anchoring requires the application of a field that is not less than the threshold field $E_c$. The field must be applied for a sufficient length of time to ensure that the reorientation of the liquid crystal in the vicinity of the surface leads to the homeotropic texture. This minimum length of time depends on the amplitude of the applied field, and also on the physical characteristics of the liquid crystal and of the alignment layer.

For the static situation (fields applied for a few milliseconds or longer), $$E_c \approx \frac{Az}{\sqrt{K_{33}\varepsilon_0\Delta\varepsilon}}$$

where Az is the zenith anchoring energy of the surface, $K_{33}$ is the elastic bending coefficient of the liquid crystal, $\Delta\in$ is its relative dielectric anisotropy, and $\in_0$ is the dielectric constant of a vacuum.

Vc is defined as the voltage for breaking anchoring such that: $Vc = E_c \cdot d$ where $\underline{d}$ is the thickness of the liquid crystal cell.

The anchoring is said to be broken when the molecules are normal to the plate in the vicinity of said surface, and the return torque exerted by the surface on the molecules is zero. In practice, it suffices for the difference between the orientation of the molecules and the normal to the surface to be sufficiently small, e.g. less than 0.5°, and for the torque which is applied to the molecules at the surface to be sufficiently small. When these conditions are united, the nematic molecules close to the broken surface are in unstable equilibrium when the electric field is switched off, and can return either to their initial orientation, or else turn in the opposite direction so as to induce a new texture differing from the initial texture by a twist of 180°.

The final texture is determined by controlling the waveform of the applied electrical signal, and in particular it depends on the way in which the field is returned to zero.

Lowering the voltage of the pulse progressively minimizes flow, with molecules close to the master plate descending slowly towards their equilibrium state, so that their elastic coupling with the molecules in the center of the sample causes them to incline likewise in the same direction, this movement diffusing to the slave plate where the molecules incline in turn quickly into the same direction, assisted by the surface torque. The uniform state U then builds up progressively at the center of the cell.

When the field drops suddenly, the orientation of the liquid crystal is modified, initially at the vicinity of the strong surface (master plate) with a surface relaxation time equal to $$\frac{\gamma_1 L^2}{K}, \text{ where } L = \frac{K_{33}}{Az}$$

is the extrapolation length of the strong layer and $\gamma_1$ is the viscosity in rotation of the liquid crystal. This time is typically of the order of one-tenth of a microsecond (μs).

Switching the strong surface in such a short length of time leads to a strong flow close to said surface, which diffuses into the volume and reaches the weak surface (slave plate) after a characteristic length of time that is shorter than one microsecond. The shear induced on the weak surface (slave plate) creates a hydrodynamic torque on the molecules of said surface. This torque is in the opposite direction to the elastic torque induced by the inclination of the master plate. When the shear is strong enough, the hydrodynamic torque on the weak surface is the stronger torque, thereby promoting the twisted texture T. When the shear is weaker, the elastic torque on the weak surface is stronger, and it induces the uniform texture U.

The direction of rotation of the molecules in the cell is represented by an arrow in FIG. 2.

Thereafter the volume reorients, with a characteristic volume relaxation time $\tau_{vol}$ equal to $$\frac{\gamma_1 d^2}{K}$$

where d is the thickness of the cell. This time, which is typically of millisecond order, is much greater than the relaxation time of the strong surface.

Practical Embodiment

In general, the switching of a BiNem liquid crystal takes place in two stages:

First Stage: Stage of Breaking Anchoring, Written C

The stage C consists in applying an electrical signal characterized by the fact that it breaks the anchoring on the slave plate. In general, the shorter the stage C, the greater the peak signal amplitude that needs to be applied.

For given amplitude and duration, the detailed waveform of the signal (slopes, intermediate levels, . . . ) does not have a determining effect on the behavior of the following stage, providing that anchoring is indeed broken.

Second Stage: Selection Stage, Written S

The voltage applied during the stage S must enable one of the two bistable textures U or T to be selected. Given the above-explained effect, it is the falling waveform of the electrical signal applied to the terminals of each pixel that determine switchover from one texture to the other.

The term "writing" is used arbitrarily for switching to the twisted texture T and the term "deleting" is used arbitrarily for switching to the uniform texture U.

To write a pixel, i.e. to switch its texture to T, it is necessary:

Stage C: Breaking Anchoring

To apply a pulse delivering a field greater than the field for breaking anchoring on the slave plate and to wait for long enough for the molecules to rise in the pixel. The breaking field is a function of the elastic and electrical properties of the liquid crystal material and of its interaction with the anchoring layer deposited on the slave plate of the cell. It can lie in the range a few volts to about 10 volts per micrometer (V/µm). The time required for the molecules to lift is proportional to the rotational viscosity γ and inversely proportional to the dielectric anisotropy of the material used, and also to the square of the applied field. In practice, this time can be lowered to a few microseconds for fields of about 20 V/µm.

Stage S: Selecting the Texture

Thereafter it suffices to lower the field quickly, creating a sudden drop of the control voltage in a few microseconds or at most in a few tens of microseconds. This sudden drop of voltage, of amplitude ΔV, is such that it is capable of inducing a sufficiently intense hydrodynamic effect in the liquid crystal. To produce the texture T, this drop must necessarily cause the applied voltage to switch from a value greater than the anchoring breaking voltage Vc to a value that is smaller than that. The time required for the applied field to drop is less than one-tenth its duration or less than 50 microseconds with long pulses.

FIGS. 3a1 and 3a2 show two implementations of pulses that induce the texture T.

In FIG. 3a1, the pulse comprises a first sequence of duration $\tau_1$ of amplitude P1 such that P1>Vc, followed by a second sequence of duration $\tau_2$ of amplitude P2 slightly smaller than P1 such that P2>Vc and P2>ΔV, which second sequence switches suddenly to zero. In FIG. 3a2, the pulse comprises a first sequence of duration $\tau_1$ of amplitude P1>Vc followed by a second sequence of duration $\tau_2$ and of amplitude P2 such that P2<Vc and: P1−P2>ΔV.

Stage C: Breaking Anchoring

To delete it is necessary to apply a pulse supplying a field greater than the anchoring breaking field on the slave plate and to wait long enough to allow the molecules to lift in the pixel, as when writing.

Stage S: Selecting the Texture

French Patent No. 96/04447 proposes two ways of implementing a "slow" descent, as shown diagrammatically in FIGS. 3b1 and 3b2. The delete signal is either a pulse of duration $\tau_1$ and amplitude P1 followed by a slope of duration $\tau_2$ with a descent time that is greater than three times the duration of the pulse (FIG. 3b1), or else a staircase descent in the form of a signal having two plateaus (FIG. 3b2) (first sequence of duration $\tau_1$ and amplitude P1, followed by a second sequence of duration $\tau_2$ and amplitude P2 such that either P2>Vc and P2<ΔV, or else P2<Vc and P1−P2<ΔV). The staircase descent with two steps is easier to implement with digital electronic means, so the slope is not described in detail herein. Nevertheless, it is possible to imagine devising a descent with a number of plateaus that is greater than two.

The waveforms of pulses characteristic of switching to one or the other of the textures are given in FIG. 3 (refer to French Patent No. 96/04447 and Giocondo, M., et al., "Write and erase mechanism of surface controlled bistable nematic pixel," *Eur. Phys. J. AP., Vol.* 5, pp 227-230 (1999)). The durations and the voltages of the plateaus (P1, $\tau_1$) and (P2, $\tau_2$) have been determined experimentally for the examples given below.

The Multiplexing Principle Applied to the Bistable Nematic Devices (BiNem)

The BiNem screens under consideration are likewise in the form of n×m pixels (FIG. 1) each pixel being located at the intersection of two perpendicular conducive strips disposed on the two respective substrates as described above. The pixel of row N+1 and column M is shown shaded. The device has connections and electronic circuits placed on the substrate or on auxiliary cards.

The writing and deleting signals applied to the pixels are made by combining row signals and column signals. They enable the screens in question to be written and deleted row by row, i.e. quickly.

Signals must be applied to the rows and the columns such that the voltages that result across the terminals of a pixel are of a type shown in FIG. 3: the voltage applied to the pixel during the row write time must be equal to a pulse which, on request, comes to an end either suddenly, leading to a sudden drop of voltage greater than or equal to ΔV so as to create the twisted texture T (usually optically black), or else to descend progressively in steps so as to create the uniform texture U (the state which is usually optically bright).

The possibility of switching between the textures T and U and vice versa, by multiplexing, is demonstrated by the electro-optical curve given in FIG. 4: the BiNem pixel is addressed with a pulse having two plateaus having a fixed value P1 and a variable value P2. Optical transmission is given as a function of the value of the second plateau P2, with P1=16 V. The pulse durations are 0.8 milliseconds (ms). Given the orientation of the polarizers in this example, a transmission minimum corresponds to the state T and a transmission maximum corresponds to the state U.

Writing Zones

For voltages P2 greater than about 11 volts, the voltage drop at the end of the plateau 2 is sufficient for writing. For voltages P2 less than 5 volts, the voltage drop at the end of the time $\tau_1$ has written, the voltage of the plateau 2 is less than Vc, the voltage drop at its end can no longer cause the texture to switch.

The value of the voltage drop ΔV needed for writing is equal to about 10 volts, for P1=16 V and Vc=6 V.

Delete Zone

It can be seen from the curve in FIG. 4 that deleting takes place for a voltage P2E lying in the range 6 V to 9 V. In this voltage range, at the end of time $\tau_1$, the molecules close to the slave plate are entrained by the flow and thus in the write direction. During plateau 2, slightly above the breaking voltage, they become almost vertical while being slightly inclined in the delete direction because of the elastic coupling with the master plate. At the end of time $\tau_2$, the voltage drop of less than ΔV is too small for the second flow to cause the molecules to stand upright and fall in its direction, and thus write. The "slow" descent is thus implemented in two steps.

The values of the second plateau corresponding to one or other of the textures are shown in FIG. 5.

In this example, during stage C of duration $\tau_1$, a voltage P1 is applied that is suitable for breaking anchoring, and during the stage S of duration $\tau_2$, a voltage P2 is applied. The texture obtained depends on the value of P2.

Multiplexing BiNems in the Prior Art

F1 and F2 are defined as two operating points situated at the rising or falling point of inflection in the optical transmission curve of FIG. 4. We consider F2 by way of example. The voltage corresponding to the point F2 is equal to 11 V, and may correspond to the value of the second plateau A2 of the row signal. The value of the column voltage C=2 V corresponds to the voltage difference needed to obtain the pixel voltage corresponding either to texture T (minimum transmission) or to texture U (maximum transmission). The value of the second plateau applied to the pixel is then either P2I=A2+C for writing (texture U) or else P2E=A2−C for deleting (texture T) with:

for the row signal: A1=16 V; A2=10 V;
for the column signal: C=2 V;
for the signal across the terminals of the pixel: P1=16 V; P2E=8 V; P2I=12 V.

These values vary depending on the properties of the liquid crystal and of the alignment layer, and can easily be adjusted for other screens made on the same principles using other materials. An example is given in Dozov, I., et al, "Recent improvements of bistable nematic displays switched by anchoring breaking," *Proceedings of SAID* 2001, pp. 224-227 (2001).

FIG. 6 shows the principle of row and column signals for writing and deleting when above-defined operating point F2 has been selected. The row signal (FIG. 6*a*) comprises two plateaus: the first provides the voltage A1 during $\tau_1$, the second A2 during $\tau_2$. The column signal (FIGS. 6*b* and 6*c*) of amplitude C is applied solely during time $\tau_2$, and is positive or negative depending on whether it is desired to delete or to write. The time $\tau_3$ separates two row pulses. FIGS. 6*d* and 6*e* show the signals applied respectively to the terminals of a deleted pixel and to the terminals of a written pixel. These signals are very simple and enable all of their parameters to be adjusted easily to the characteristics of the screen.

Optimizing the Column Signal as Described in French Patent No. 02/1448

In a patent application filed in France on Feb. 6, 2002 under the No. 02/01448, the Applicant has described various improvements to displays of the BiNem type seeking to optimize the column signal. Those improvements are recalled below in order to incorporate them in the present patent application.

In that document, the parameters of the signals applied to the column electrodes of the screen are adapted so as to reduce the rms voltage of the interfering pixel pulses to a value which is lower than the Freedericksz voltage, so as to reduce the interfering optical effects of the addressing.

EXAMPLE 1

Reducing the Duration of the Column Pulse

The new column signal C' is applied for a time $\tau_c < \tau_2$, while keeping the amplitude C' at substantially the same order as C, since an increase in C' would increase the rms value of the interfering voltage applied to the pixels, and decreasing C' would prevent switching from taking place because of the limitation shown by the electro-optical curve of FIG. 4. In this example, the selection stage is shortened compared with the preceding circumstances by a duration $\tau_c$.

The signals corresponding to Example 1 are given in FIG. 7.

FIG. 7 shows in FIG. 7*a*: a row signal, in FIG. 7*b*: a column delete signal, in FIG. 7*c*: a column write signal, in FIG. 7*d*: a delete pixel signal, and in FIG. 7*e*: a write pixel signal.

Reducing the duration of the column signal provides two benefits:

1) This variant minimizes the interfering signal since the pixels in non-selected rows receive the voltage C' during time $\tau_c$ only, which is close to $\tau_2/2$, for example. 2) By shortening the column pulse while synchronizing its drop with that of the row pulse, the "slow" descent of the pixel signal takes place in three plateaus. With this method, when deleting, the hydrodynamic flow of the liquid crystal is reduced compared with that obtained with a pulse having two plateaus. The maximum instantaneous voltage drop between each of the three plateaus is smaller than between two plateaus, for identical row voltage. This therefore encourages tilting towards the uniform texture U to a greater extent. For writing, the hydrodynamic flow is not modified compared with the two-plateau situation, since the maximum instantaneous voltage drop is identical. The inventors have shown that this method makes it possible, without complicating the control electronics, to obtain switching between the two states even when the viscosity of the liquid crystal material increases at low temperature.

Still more precisely, the signals shown in FIG. 7 are as follows.

The row signal shown in FIG. 7 comprises a first sequence of duration $\tau_1$ and amplitude A1 followed by a second sequence of duration $\tau_2$ (greater than $\tau_1$) and of amplitude A2 (less than A1). The rising and falling fronts of these two sequences are practically vertical.

The delete column signal shown in FIG. 7*b* comprises a pulse of duration $\tau_c$ and amplitude C' of the same polarity as the row signal shown in FIG. 7*a*. The rising and falling fronts of this signal are practically vertical. The duration $\tau_c$ is less than the duration $\tau_2$. The falling front of the delete column signal is synchronized on the falling front of the row signal.

The write column signal shown in FIG. 7*c* differs from the delete column signal shown in FIG. 7*b* by a polarity reversal. Thus, in FIG. 7*c* there is a pulse of duration $\tau_c$ and amplitude C', with vertical rising and falling fronts, the falling front being synchronized with the falling front of the row signal.

As shown in FIG. 7d, the voltage present across the terminals of the pixel when deleting comprises a run of three crenellations having vertical rising and falling fronts. The first plateau is of amplitude A1 and lasts for $\tau_1$. The second plateau is amplitude A2 and lasts for $\tau_2-\tau_c$. The third is plateau of amplitude A2−C' and lasts for $\tau_c$.

As shown in FIG. 7e, the voltage present across the terminals of the pixel when writing likewise comprises three successive plateaus with vertical rising and falling fronts: a first plateau of duration $\tau_1$ and amplitude A1; a second plateau of amplitude A2 and duration $\tau_2-\tau_c$; and a third plateau of amplitude A2+C', of duration $\tau_c$.

Nevertheless, it should be observed that when deleting the pixel, the intermediate plateau has an amplitude A2 lying between the highest initial amplitude A1 and the lowest final amplitude A2−C', whereas when writing the pixel, the intermediate amplitude A2 is less than the highest initial amplitude A1 and the final amplitude A2+C'.

EXAMPLE 2

Modifying the Waveform of the Column Pulse

The waveform of the column signal is modified so as to reduce its rms voltage compared with that of a standard column signal made up of rectangular pulses. The duration of the column signal may also be reduced relative to the conventional $\tau_2$, so as to benefit from the advantages of variant 1.

Illustration 1

As a first example, use is made of a ramp type column signal. The amplitude of this column signal increases linearly with time until it reaches a maximum peak voltage C", and is then suddenly reduced to zero synchronously with the end of the row pulse.

The maximum value of the column signal C" can be increased relative to the conventional value C, thus making it easier to switch between the two textures (cf. the electro-optical curve of FIG. 4).

An example of such signals is given in FIG. 8. In this case also, there can be seen in FIG. 8a: a row signal, in FIG. 8b: a column delete signal, in FIG. 8c: a column write signal, in FIG. 8d: a pixel delete signal, and in FIG. 8e: a pixel write signal. The column pulse is the duration $\tau_c$ and its waveform comprises a slope having a maximum C".

Still more precisely, the signals shown in FIG. 8 are as follows.

The row signal shown in FIG. 8a comprises a first sequence of duration $\tau_1$ and amplitude A1 followed by a second sequence of duration $\tau_2$ (greater than $\tau_1$) and an amplitude A2 (less than A1). The rising and falling fronts of these two sequences are practically vertical.

The column delete signal shown in FIG. 8b comprises a pulse of duration $\tau_c$ comprising a linear ramp rising front reaching the amplitude C" followed by a vertical falling front.

The column write signal shown in FIG. 8c differs from the column delete signal shown in FIG. 8b by a polarity reversal. In FIG. 8c, there can thus be seen a pulse of duration $\tau_c$ having a linear rising front that reaches the amplitude C" followed by a vertical falling front.

The voltage present across the terminals of the pixel when deleting, as shown in FIG. 8d, comprises three successive sequences: a first sequence of amplitude A1 and duration $\tau_1$; a second sequence of amplitude A2 and duration $\tau_2-\tau_c$; and a third sequence of progressively decreasing amplitude of duration $\tau_c$ going from an initial amplitude A2 to a final amplitude A2−C".

In this case also, the value A2 in FIG. 8d is an intermediate value.

The voltage present across the terminals of the pixel when writing likewise comprises three successive sequences: a first sequence A1 of amplitude A1 and duration $\tau_1$; a second sequence of amplitude A2 and duration $\tau_2-\tau_c$; and a third sequence of progressively increasing amplitude, of duration $\tau_c$, going from the initial value A2 to the higher value A2+C". As in the case of FIG. 8c, and in a manner comparable to FIG. 7e, the value A2 is an intermediate value.

Illustration 2

By way of example, a column signal is used that increases through two plateaus C1 and C2 of respective durations $\tau_{c1}$ and $\tau_{c2}$. An example of such signals is given in FIG. 9. Here again, there can be seen in FIG. 9a: a row signal, in FIG. 9b: a column delete signal, in FIG. 9c: a column write signal, in FIG. 9d: a pixel delete signal, and in FIG. 9e: a pixel write signal. The column pulse of duration $\tau_c=\tau_{c1}+\tau_{c2}$ and its waveform comprises two plateaus.

Multiplexing Variants—Obtaining a Mean Value of Zero

In order to take account of problems whereby certain liquid crystal materials degrade by electrolysis on being subjected to a direct current (DC) voltage, it is often useful to apply signals to the pixels of zero mean value. FIGS. 10, 11, and 12 show techniques enabling the theoretical signals of FIG. 6 to be transformed into symmetrical signals of zero mean value.

In FIG. 10, referred to as "row symmetrization", identical signals of opposite polarity follow one another to form the row selection signal. FIGS. 10a, 10b, 10c, 10d, and 10e show respectively row signals, column delete signals, column write signals, delete signals across the terminals of a pixel, and write signals across the terminals of a pixel. Row symmetrization may be total, i.e. applied both to row signals and to column signals, as shown in FIG. 10, or it may be partial, i.e. it may be applied to row signals only and not to column signals. In which case, the column signal for selecting texture can be conserved.

Another symmetrization technique is shown in FIG. 11 which is referred to as "frame symmetrization". The signals are the same as in FIG. 6, but their signs are reversed on each change of image. In this case also, symmetrization can be partial or total.

In the above circumstances and because of the symmetrization, the row driver signal needs to deliver a voltage of ±A1, i.e. a total excursion of 2·A1. A considerable simplification of the drivers can be obtained by reducing the excursion maximum to a value of less than 2·A1. To do this, it suffices to change synchronously the operating midpoint $V_M$ of the row signal and of the corresponding column signal during the second polarity. Starting from the circumstances shown in FIG. 10, this consists in adding a common voltage $V_M$ to all of the row and column signals during the symmetrization stage. FIG. 12 gives an example of a signal $V_M=0$ during the first polarity and $V_M$ other than 0 during the second polarity. This principle is applicable with $V_M$ different from zero during the first polarity followed by $V_M$ different from zero during the second polarity. The important point is that the voltage across the terminals of the pixel remain unchanged, as shown in FIG. 10. In this case also, FIGS. 12a, 12b, 12c, 12d, and 12e represent respectively row signals, column delete signals, column write signals, delete signals across the terminals of a pixel, and write signals across the terminals of a pixel.

All of these symmetrization means can be applied to the above-described column signals.

Limitation of the Conventional BiNem Multiplexing Method in Terms of Speed

When addressing a single row at a time using one of the above-described methods, the minimum time interval between addressing two rows is equal to $\tau_1+\tau_2$ or to $2(\tau_1+\tau_2)$ if the polarities are alternated during addressing of a given row (cf. FIG. 10). For example, the following values can be used: $\tau_1$=1 ms, $\tau_2$=1 ms, and $\tau_c$=200 μs, giving a minimum row addressing time of 2 μs if the polarity reversal takes place on a per frame basis (referred to as circumstance 1) and of 4 ms if polarity reversal takes place during row addressing (referred to as circumstance 2).

Unfortunately, the duration which determines the state of a pixel (written or deleted) is shorter than said duration, and equal to $\tau_c$, i.e. 200 μs in the example described.

The time for addressing an image having 160 rows is thus at least 320 ms, whereas the time needed for determining the state of all of the pixels is 200 μs×160=32 ms.

SUMMARY OF THE INVENTION

A general object of the present invention is to improve the bistable display devices described in French Patent No. 96/04447. Such devices are generally referred to as "BiNems". This terminology is used in the present patent application. The structure of such devices is described in greater detail below.

Still more precisely, the object of the invention is to reduce the time required to address an image displayed on a screen of the multiplexed BiNem type.

As mentioned above, the present invention applies in particular to so-called BiNem devices using two textures, one that is uniform or lightly twisted and referred to as U, in which the molecules are at least substantially parallel to one another, and the other being twisted and referred to as T which differs from the first by a twist of the order of ±180°.

The inventors propose a novel method of addressing a multiplexed BiNem screen enabling an image to be displayed more quickly by addressing a plurality of rows simultaneously with time overlap between row pulses.

To this end, the inventors provide a method of electrically addressing a matrix screen of bistable nematic liquid crystals with breaking of anchoring, the method comprising the steps which consist in applying controlled electrical signals respectively to row electrodes and to column electrodes of the screen, and being characterized in that it further comprises the steps which consist in simultaneously addressing a plurality of rows using similar row signals that are offset in time by a duration greater than or equal to the time column voltages, said row addressing signals comprising in a first period at least one voltage value serving to break the anchoring of all of the pixels in the row, followed by a second period enabling the final states of the pixels making up the address row to be determined, said final states being a function of the value of each of the electrical signals applied to the corresponding columns.

The present invention also provides a device for addressing a matrix screen.

BRIEF DESCRIPTION OF THE FIGURES

FIG. 3 shows the conventional pixel signals enabling switching between the two textures. The drop time of the write signal lies in the range a few microseconds and a few tens of microseconds. Two delete signals are proposed: one is a pulse followed by a ramp whose drop time is greater than three times the duration of the pulse, the other is a downward staircase, the signal having two plateaus.

DETAILED DESCRIPTION OF THE INVENTION

Figure 1:
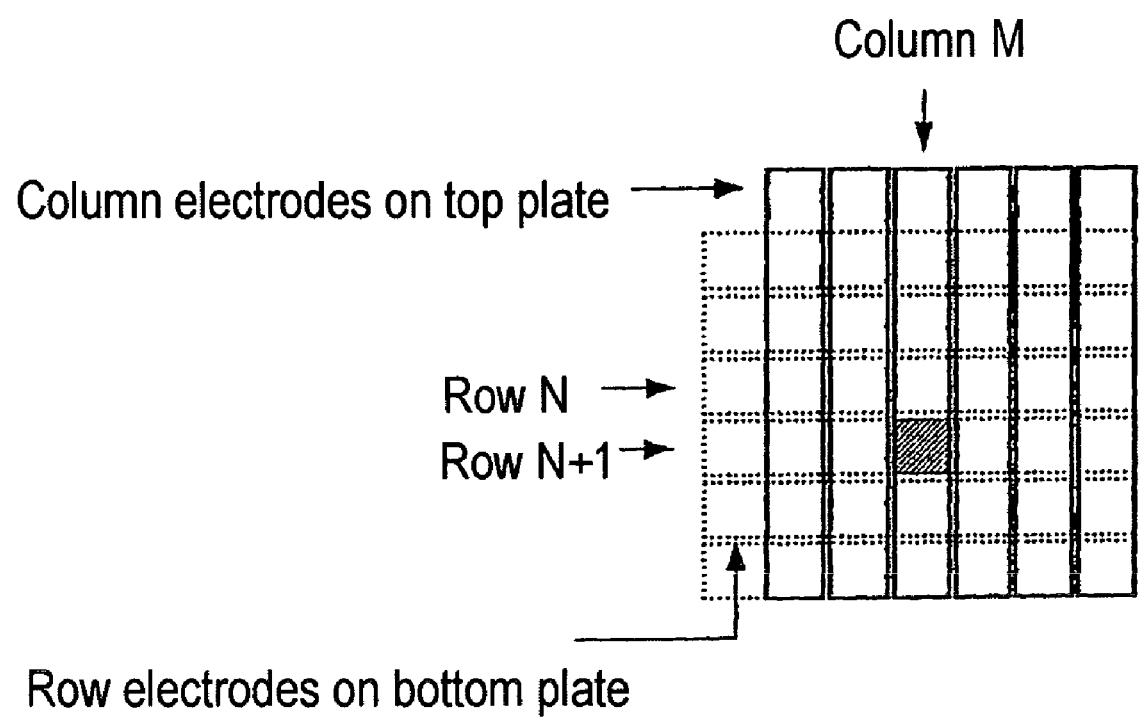
FIG. 1 shows the principle of a conventional multiplexed matrix screen. The active zone of one pixel is situated at the intersection between row and column electrodes. Arbitrarily, the row electrodes are shown as being on the top substrate or plate, while the column electrodes are shown as being on the bottom substrate or plate. When row N is addressed, the column signals are applied simultaneously to all of the columns, after which addressing moves onto the following row.
Figure 2:
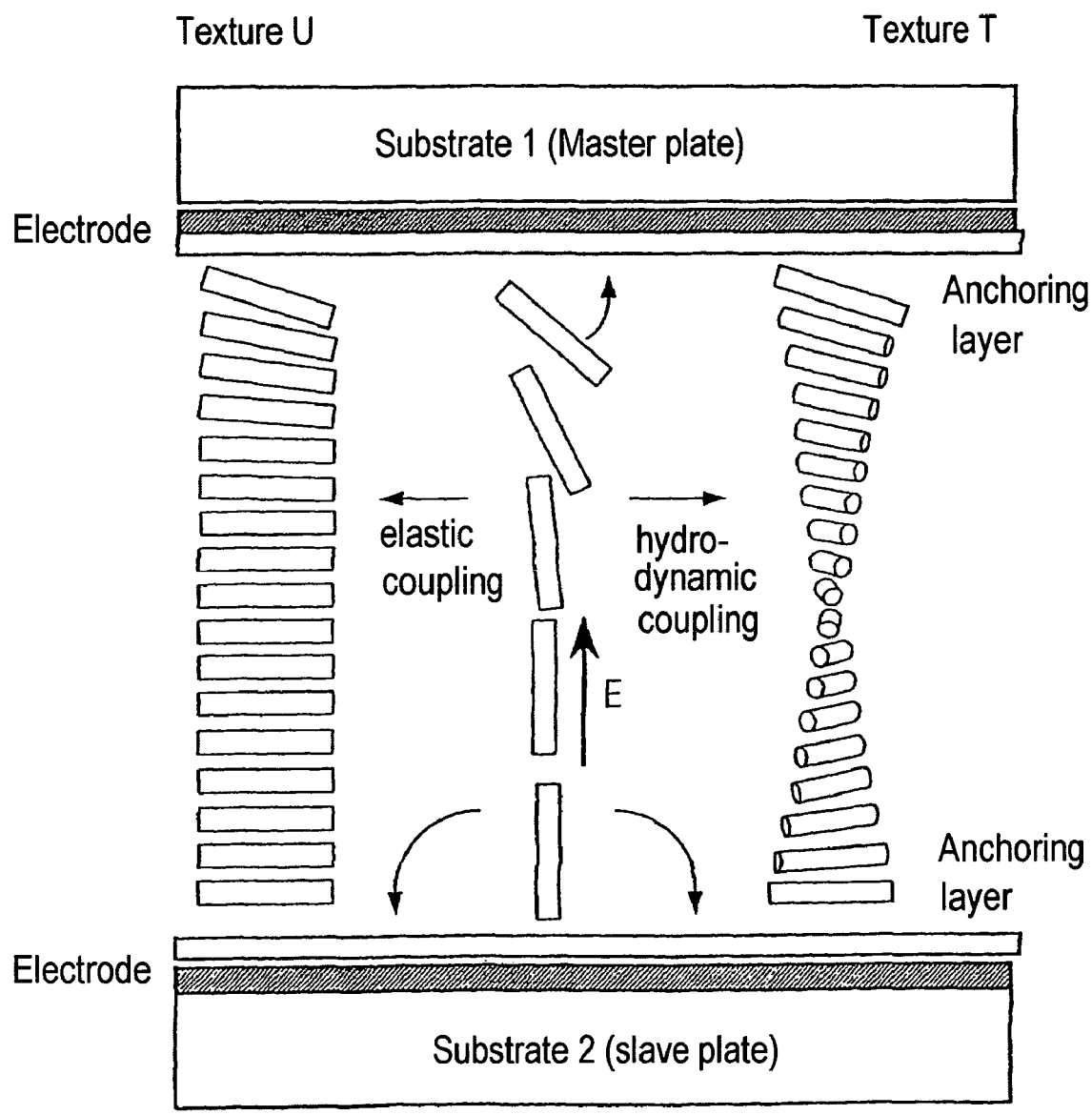
FIG. 2 is a diagram showing the state of the art corresponding to French Patent No. 96/04447 and more precisely showing one pixel of the liquid crystal cell, and in this pixel, the two textures that are stable without any field being applied to the molecules: the textures being referred to as uniform U and twisted T. The central portion of the figure shows the texture of the molecules with a field applied between the electrodes carried by the two substrates. The arrows show the rotations of the molecules when the field ceases.
Figure 4:
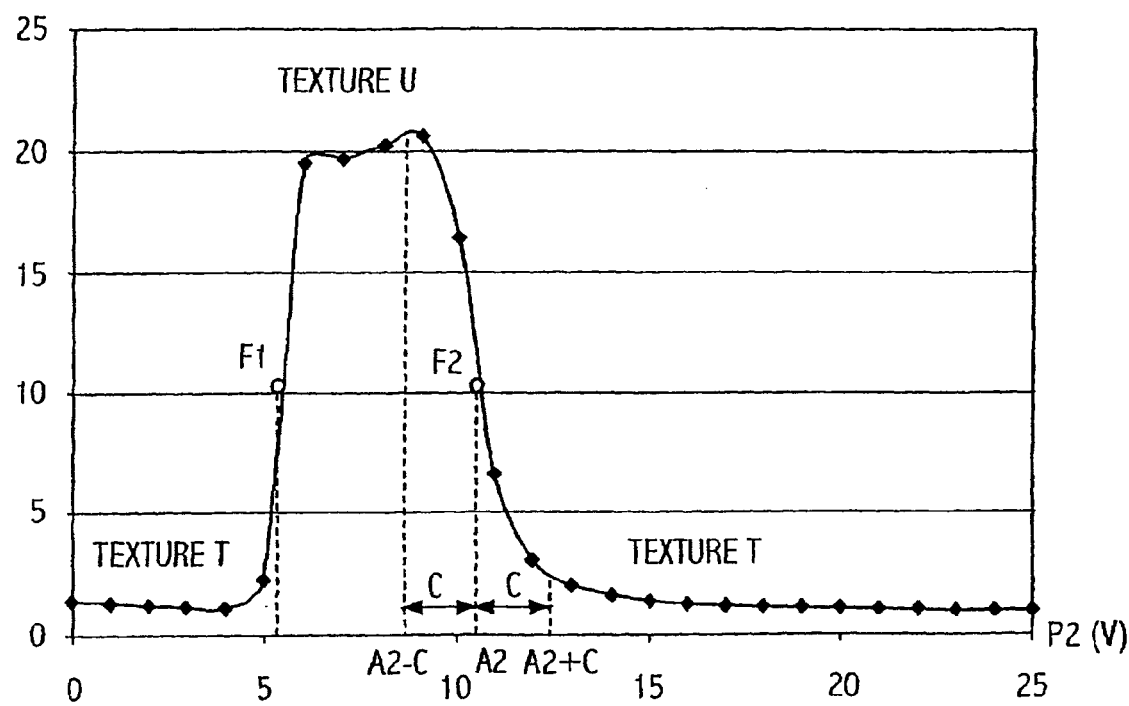
FIG. 4 shows an example of an electro-optical curve for a liquid crystal pixel operating in application of the conventional principle shown in FIG. 2. The first applied voltage plateau is equal to 16 V, and the degree of optical transmission is a function of the value of the second plateau. There can be seen two operating points that are compatible with multiplexed addressing.
Figure 5:
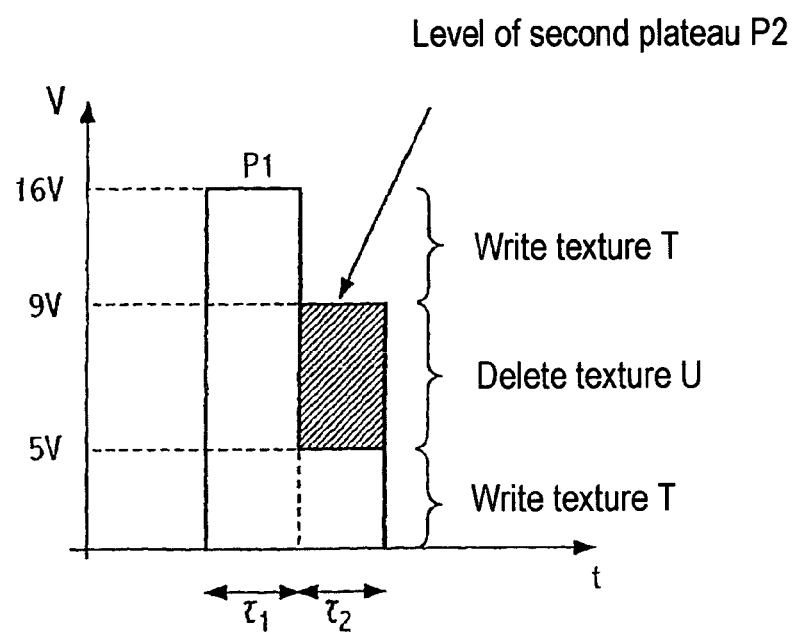
FIG. 5 shows the correspondence between the value of the second plateau and the texture obtained in a conventional device. In the example of FIG. 4, the uniform texture U is obtained for a second plateau having a value lying in the range 5 V to 9 V. For a second plateau having a value lying in the range 0 to 5 V, or in the range 9 V to 16 V, a twisted texture T is obtained.
Figure 6A:
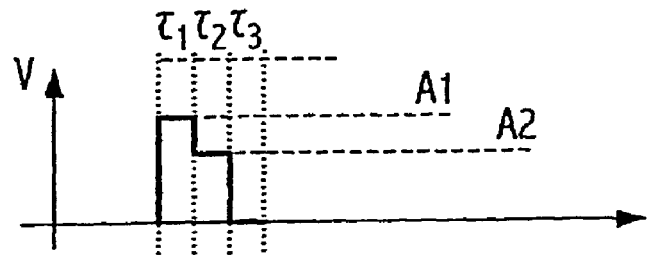
FIG. 6 shows the row and column signals for conventional multiplexed addressing: obtaining one or the other of the two textures as a function of the sign of the column signal.
Figure 6B:
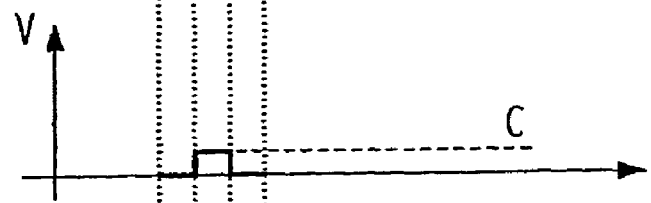
Figure 6C:
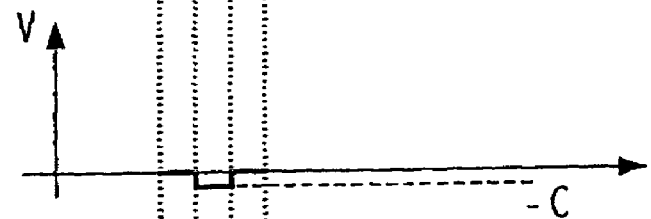
Figure 6D:
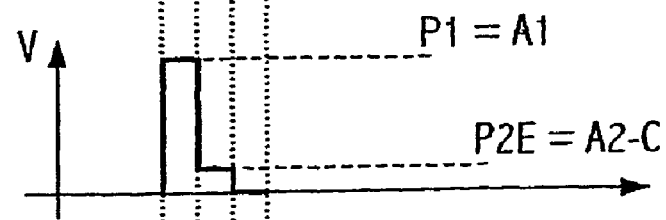
Figure 6E:
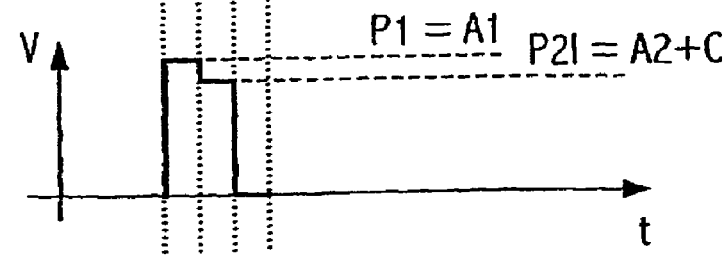
Figure 7A:
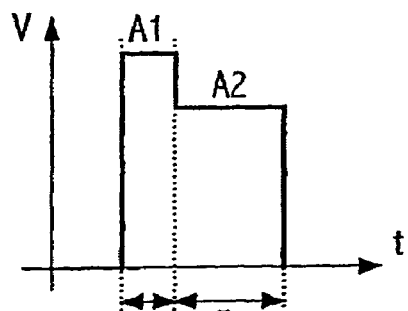
FIG. 7 shows a variant of a novel signal waveform proposed in French Patent No. 02/01448. The column pulse lasts for a time that is shorter than the duration of the second plateau of the row signal and presents a crenellated waveform with a drop that is synchronized with the drop of the second plateau of the row signal.
Figure 7B:
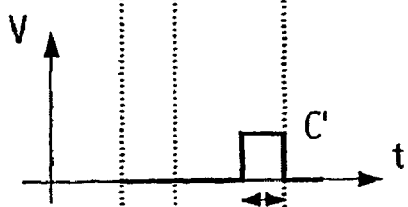
Figure 7C:
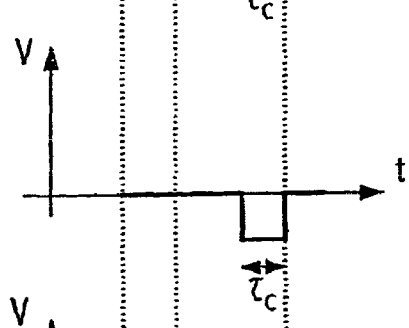
Figure 7D:
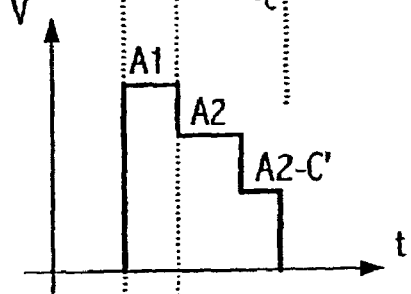
Figure 7E:
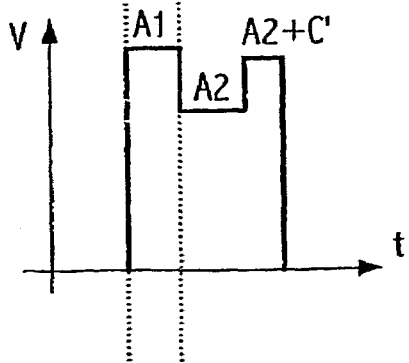
Figure 8A:
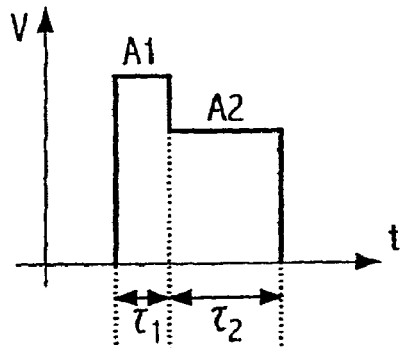
FIG. 8 shows another variant of a novel signal waveform described in French Patent No. 02/01448. The column pulse lasts for a length of time that is shorter than the duration of the second row signal plateau and presents a ramp waveform with a drop that is synchronized with the drop of the second plateau of the row signal.
Figure 8B:
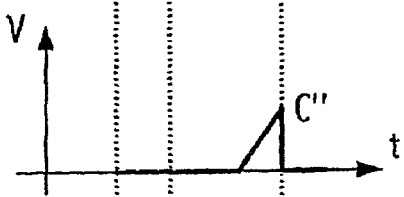
Figure 8C:
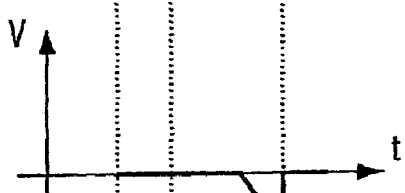
Figure 8D:
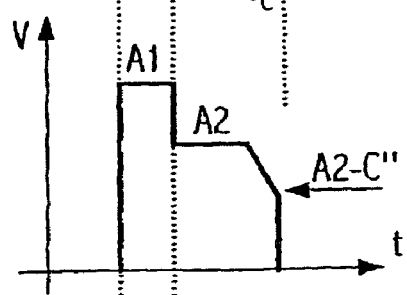
Figure 8E:
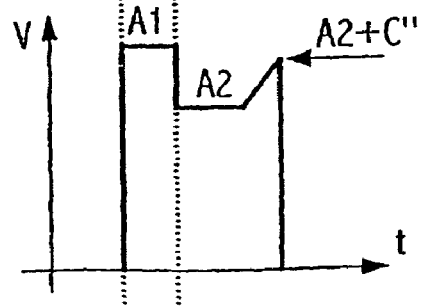
Figure 9A:
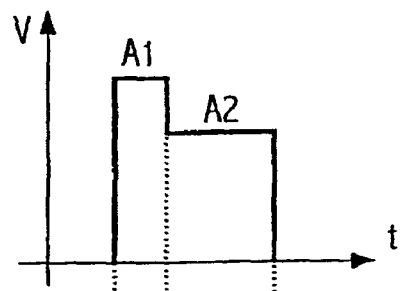
FIG. 9 shows yet another variant of a novel signal waveform described in French Patent No. 02/01448. The column pulse lasts for a length of time that is shorter than the duration of the second plateau of the row signal, and it has a two-plateau waveform with a drop that is synchronized with the drop of the second plateau of the row signal.
Figure 9B:
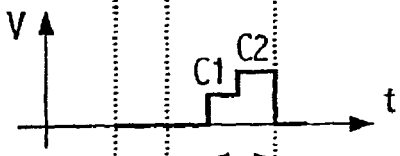
Figure 9C:
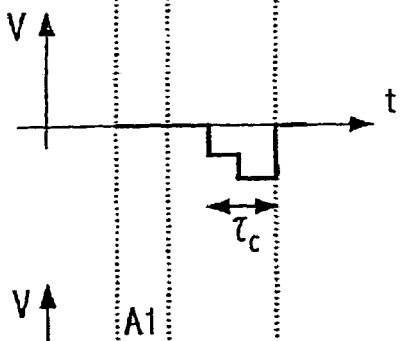
Figure 9D:
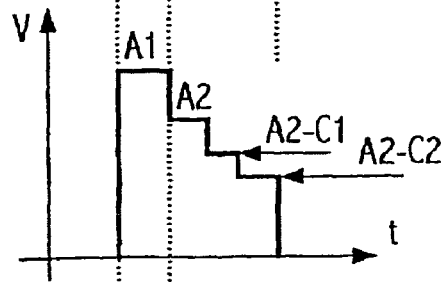
Figure 9E:
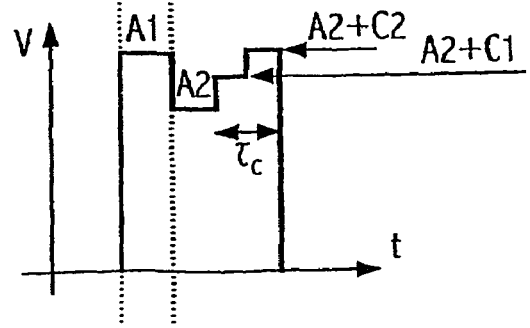
Figure 10:
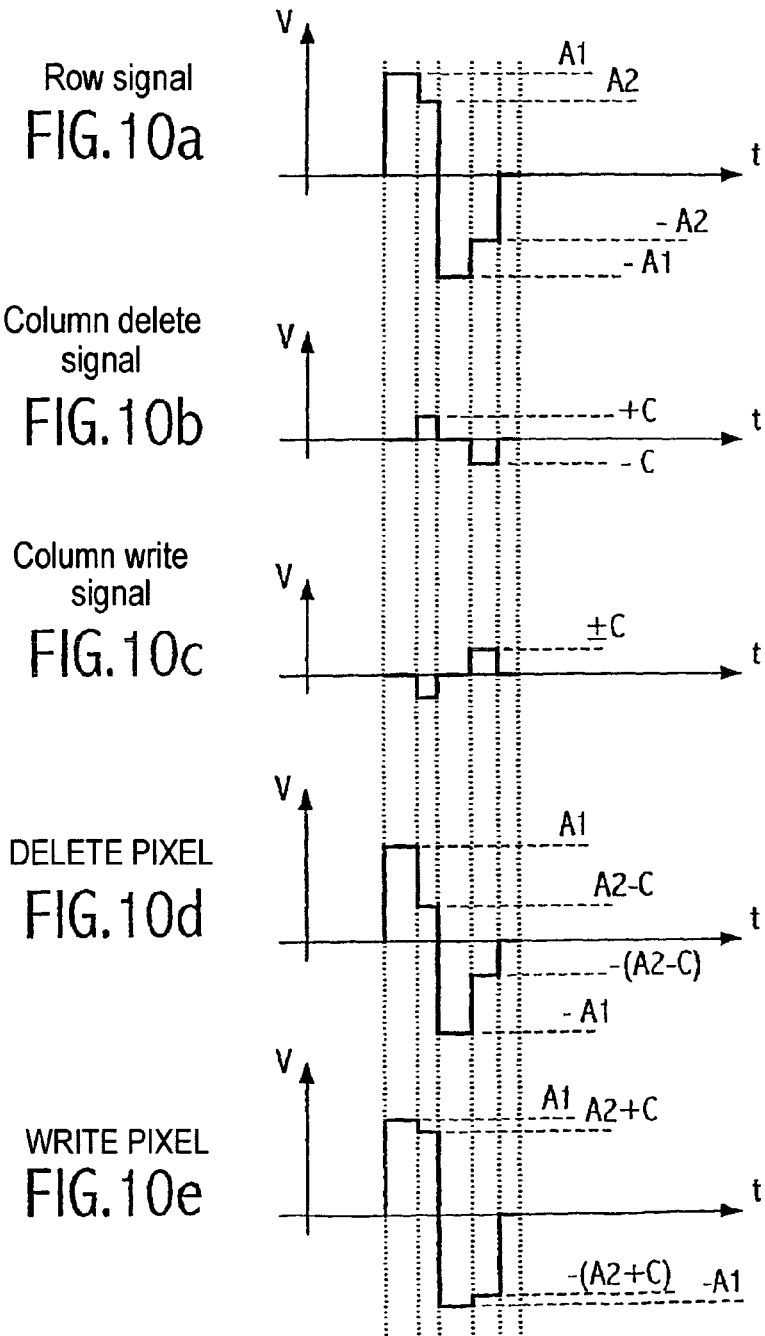
FIG. 10 shows a conventional improvement proposed to avoid polarizing a liquid crystal cell, since that might lead to slow degradation of the material by electrolysis. The row and column signals are made symmetrical, so that their mean value becomes zero.
Figure 11:
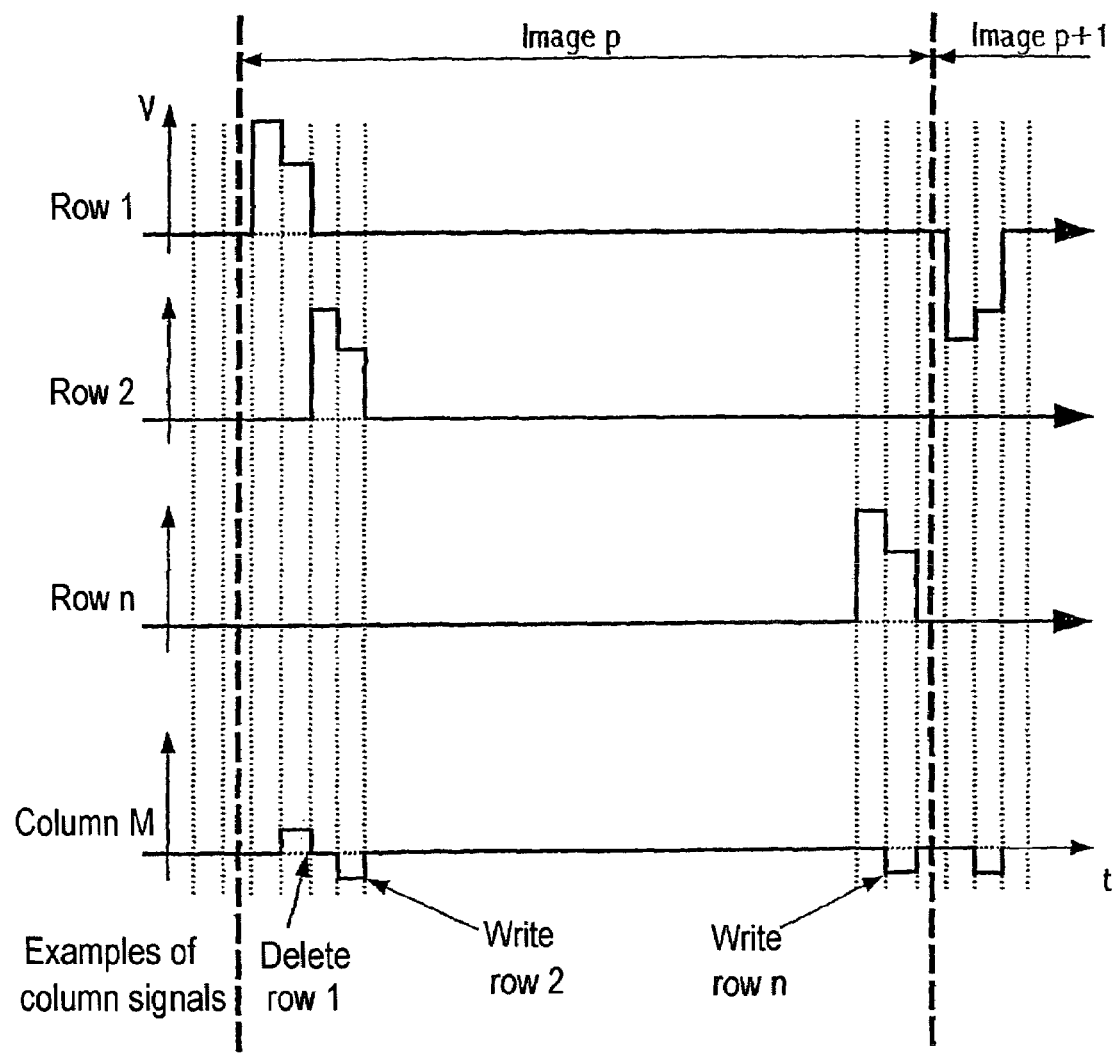
FIG. 11 shows another conventional version in which symmetry is obtained by reversing polarity from one image to the next.
Figure 12:
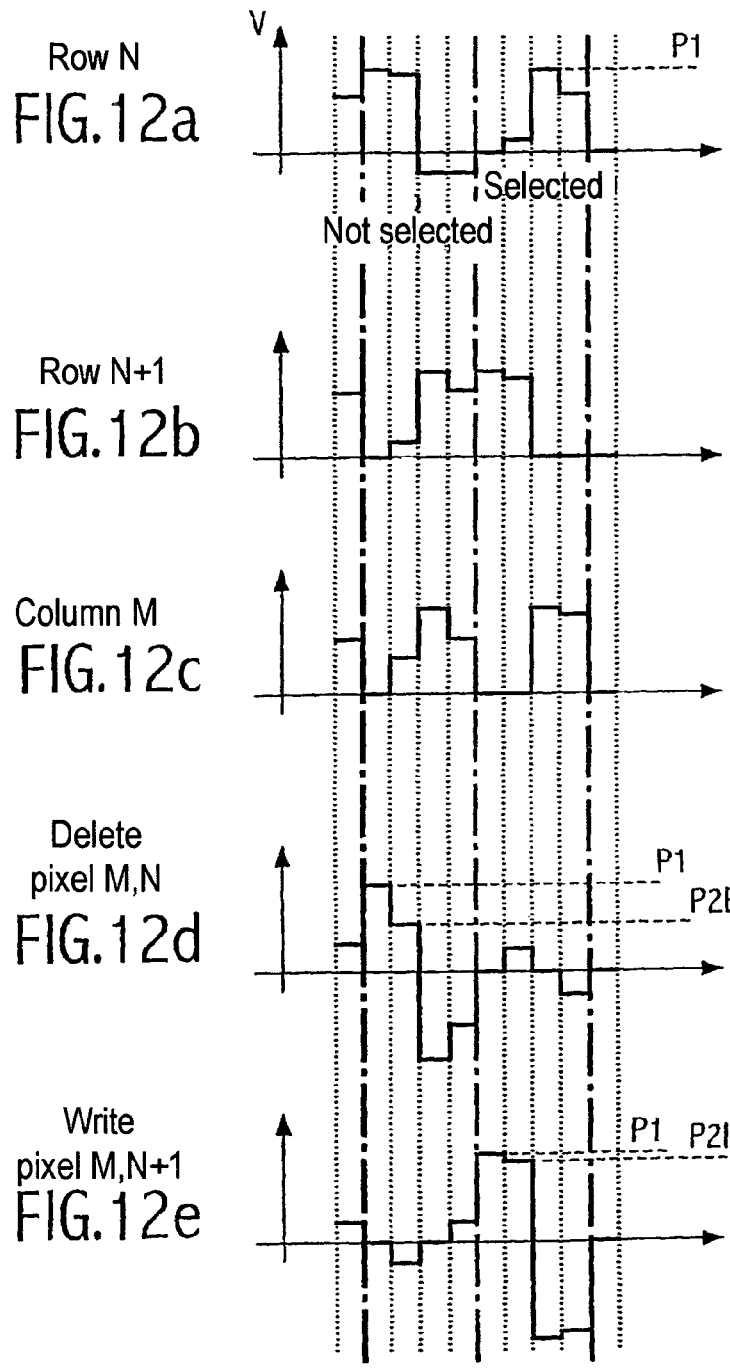
FIG. 12 shows signals enabling symmetrical signals to be applied to the pixels while minimizing the voltage excursion of the control circuits. Under such circumstances, non-selected rows receive a row signal equal to the mean of the column signal instead of receiving no signal as under the circumstances described above.

Because of the specific nature of the BiNem screen, in which switching takes place and is perceived only at the end of the application of signals to the terminals of the pixel, the constraints on implementing addressing for a plurality of rows simultaneously are very different from those that apply to a conventional LCD screen that obeys the Alt and Plesko criterion. In a conventional LCD screen subject to the Alt and Plesko criterion, the voltage applied at each instant contributes to the optical state that is obtained at the pixel insofar as it has an effect on the mean rms voltage that is applied thereto. For a BiNem type LCD, it is only the waveform at the end of the pulse applied to the pixel that influences switching between the two textures, and thus that influences the final optical state. It is therefore possible to propose an addressing scheme in which time overlap exists between a plurality of rows.

The time offset between the rows is no longer equal to the duration $\tau_L$ as described in document [1], and its value is $\tau_D$ where:

$$\tau_c \leq \tau_D < \tau_L$$

where $\tau_L$ is the row addressing time which comprises at least two addressing stages (stage C for breaking anchoring and stage S for selecting texture) and $\tau_c$ is the duration of the column signal.

The present invention offers numerous advantages over the prior art. Three main advantages are described below.

First Advantage of the Invention: Speed of Addressing the Image

Let $x$ be the number of rows that are addressed simultaneously.

For a given value of $\tau_L$, the optimum number of rows that can be addressed simultaneously while taking advantage of a saving in time is:

with no symmetrization or with "frame" symmetrization:

$$x_{opt} = \text{integer portion of } [\tau_L/\tau_D]$$

for "row" symmetrization:

$$x_{opt} = \text{integer portion of } [2 \cdot \tau_L/\tau_D]$$

A worked example: $\tau_L = 2$ ms; $\tau_D = 200$ µs, giving:

no symmetrization or "frame" symmetrization:

$$x_{opt} = 10$$

"row" symmetrization, whether partial or total:

$$x_{opt} = 20$$

The time required to address the $x$ rows in accordance with the invention is $\tau_L + [\tau_D \cdot (x-1)]$ which should be compared with $x \cdot \tau_L$ that applies to standard sequential addressing.

The saving in addressing time over an image is calculated as follows:

Let T1 be the addressing time of an n-row image using the standard method of one row at a time, and let Tx be the time for addressing the $n$ rows in accordance with the invention ($x$ rows at a time). The following relationship applies:

$$Tx \approx T1/x \text{ for a large number } n \text{ of rows.}$$

A worked example with no symmetrization or with frame symmetrization:

$$\tau_L = 1.2 \text{ ms}$$

$$\tau_c = 100 \text{ µs and } \tau_D = 200 \text{ µs}$$

By addressing three rows at a time (x=3), the conventional method would take 3.6 ms for those three rows while the addressing method of the invention performs said addressing in 1.6 ms.

For an image having 160 rows:

$$T1 = 160 \times 1.2 = 190 \text{ ms}$$

$$T3 = (160/3) \times 1.6 = 85 \text{ ms}$$

The time for addressing the image has been reduced by a factor of more than 2.

Second Advantage of the Invention: Improving Switching and Reducing Row Voltages Because of the time overlap, it is possible to increase the duration of stage C without reducing the display rate. This increase makes it possible to reduce the breaking voltages down to a limit value close to the static breaking threshold. Under such circumstances, the adjustment excursion of the row and column voltages needed to guarantee good operation is considerably reduced. For example, the screen operates over a temperature range of more than 10° C. without requiring these voltages to be adjusted, which is not true for fast operation without time overlap. To obtain maximum benefit from this advantage, the number of rows addressed simultaneously may be selected to be greater than $x_{opt}$. The time saving will remain that corresponds to $x_{opt}$, but the same row can continue to be addressed for longer.

In addition, the reduction in the breaking voltage makes it possible to use drivers operating at lower voltage and that are therefore cheaper.

Third Advantage: Simplicity of the Row Signals

In the addressing system using time overlap, it is clear that a plurality of rows are addressed simultaneously. Nevertheless, the row selection signals can remain very simple, and there is no need to satisfy a condition of orthogonality, not even approximately, unlike the signals that are needed for implementing MLA.

Furthermore, the present invention can give rise to numerous variant implementations. Two main variants are described in succession below comprising respectively: 1) addressing a plurality of consecutive rows with offset; and 2) addressing a plurality of non-consecutive rows, with offset.

Variant 1: Offsetting a Plurality of Consecutive Rows

Figure 13:
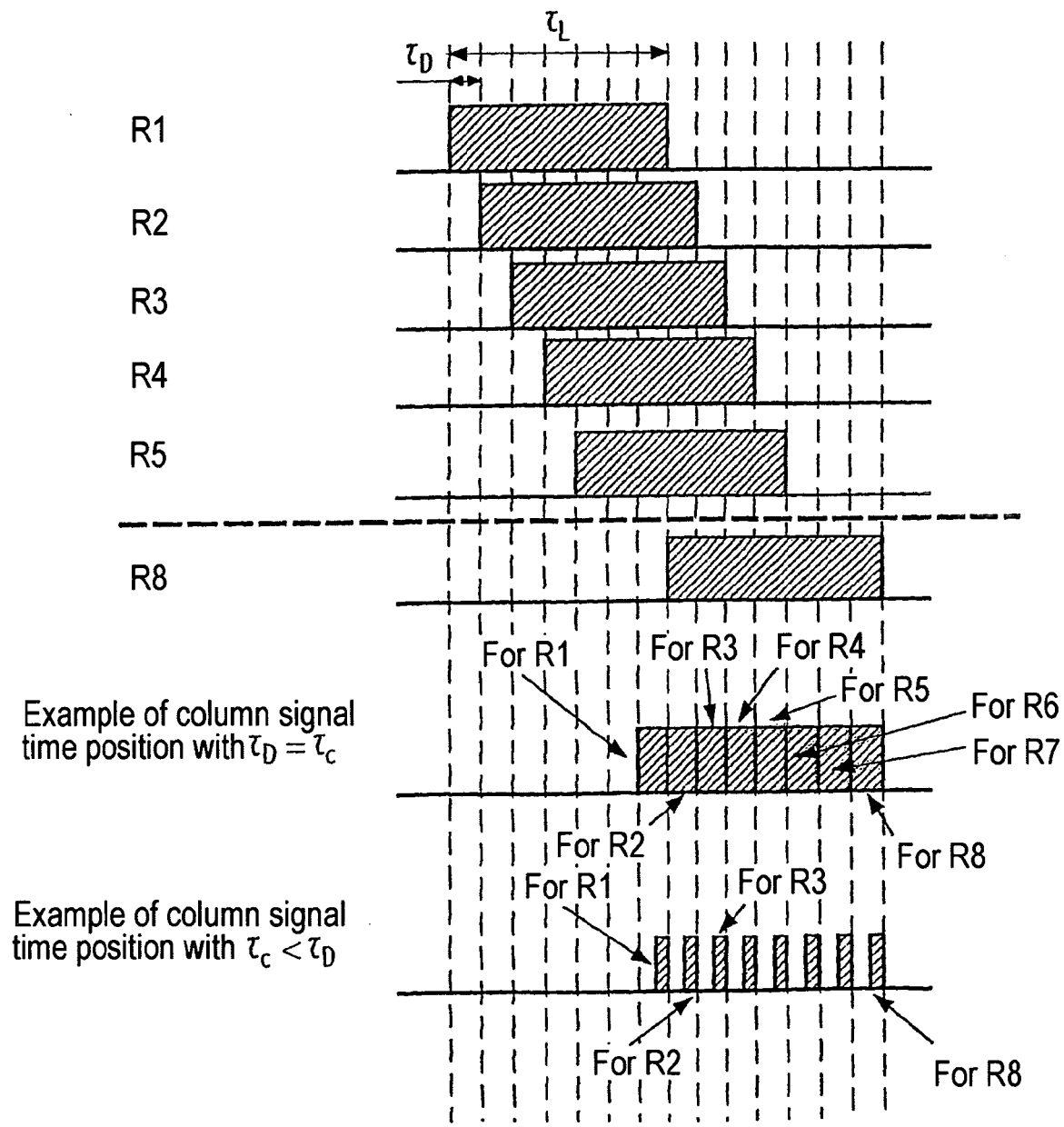
FIG. 13 shows the principle of addressing a BiNem screen by time overlap of the addressing pulses for consecutive rows (in this figure seven consecutive rows) without symmetrization.

An example of a timing diagram corresponding to x=7 consecutive rows addressed simultaneously with a time offset $\tau_D$ from one row to the next is shown in FIG. 13. The column signals corresponding to each row are sent sequentially once every $\tau_D$.

The row signal has a total duration $\tau_L=x\tau_D$, which in this case gives $\tau_L=7\tau_D$, for a column signal of duration $\tau_c$.

In FIG. 13 (as in FIGS. 14 to 18), the shaded blocks correspond to times during which the rows and the columns are addressed, without specifying the waveforms of the applied pulses. This figure shows the general principle of time overlap for row pulses, which principle is independent of the content of the blocks, which corresponds to the waveform of the row and column pulses.

On examining FIG. 13, it will be understood that the beginning of the row signal for the $(i+x)^{th}$ row is synchronized on the end of the row signal for the $i^{th}$ row, i.e. in this case the beginning of the row signal for the eighth row is synchronized on the signal for the first row.

FIG. 13 is a diagram showing the principle of time overlap for row pulses when there is no symmetrization.

The bottom of FIG. 13 (and also of FIGS. 14 to 19) shows firstly an example of the time position of the column signal with $\tau_c=\tau_D$, and secondly an example of the time position of the column signal with $\tau_c<\tau_D$. In both circumstances, the end of the column signal of duration $\tau_c$ is synchronized with the end of the corresponding row signal of duration $\tau_L$.

Figure 14:
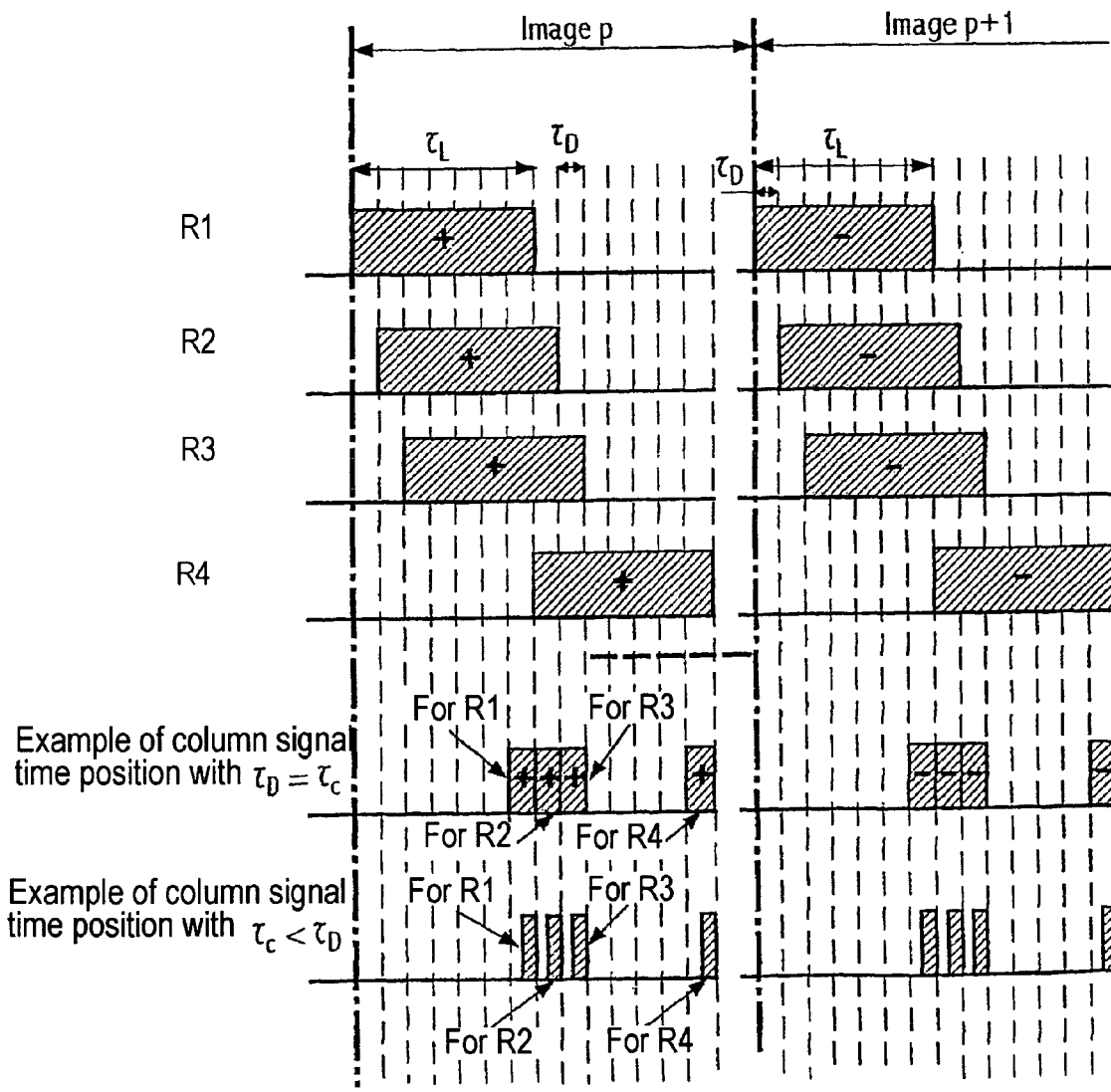
FIG. 14 shows the principle of addressing a BiNem screen by time overlap of the addressing pulses for consecutive rows (in this figure three consecutive rows) with frame symmetrization.

FIG. 14 is a diagram showing the principle of time overlap with frame symmetrization.

In this circumstance, the polarities of the row signals and of the column signals are reversed from one image p to the following image p+1.

The column signals corresponding to each row are sent sequentially every $\tau_D$, which value corresponds to the time offset between two successive row signals of the simultaneous addressing.

Figure 15:
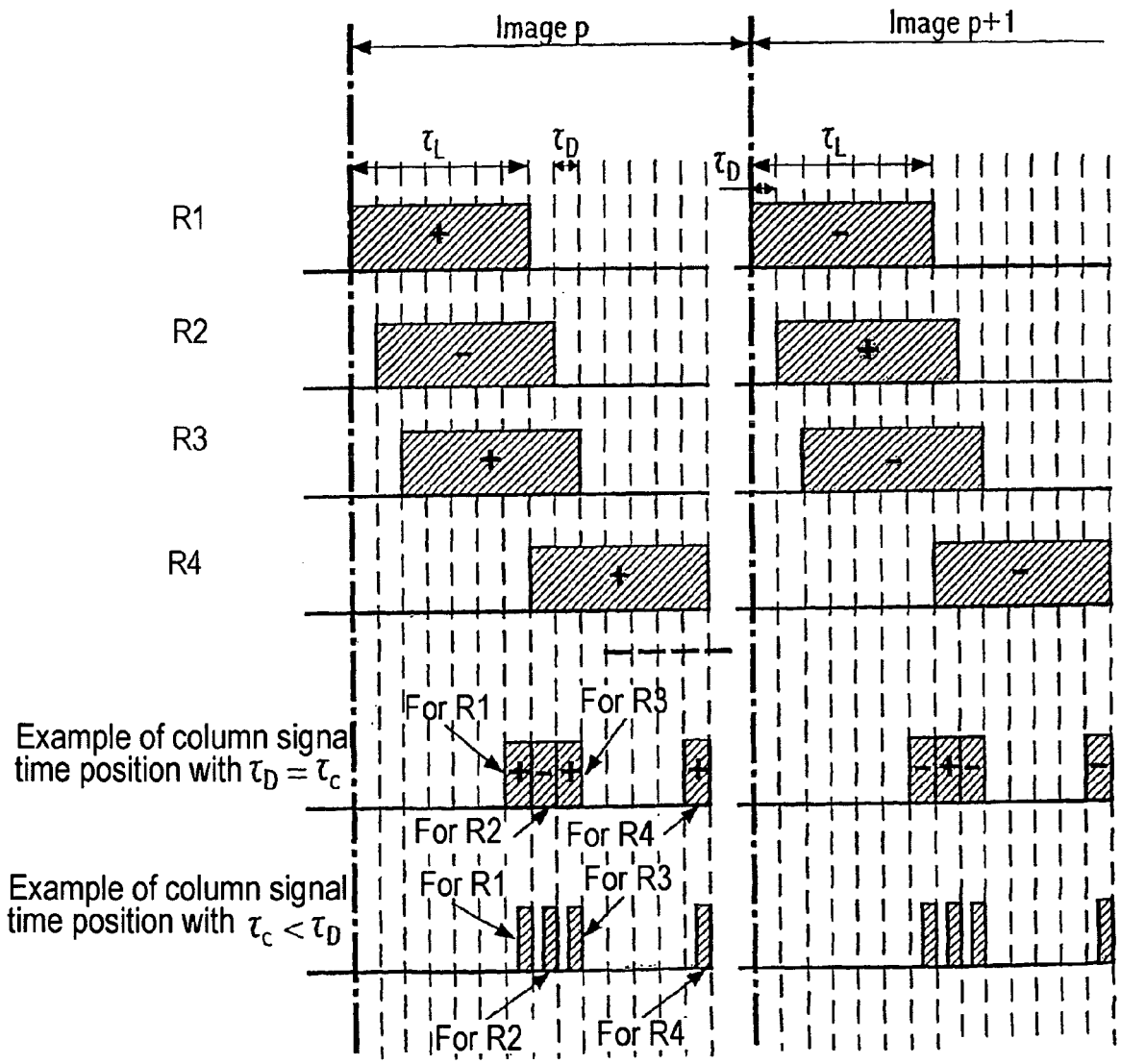
FIG. 15 shows the principle of addressing a BiNem screen by time overlap of the addressing pulses for consecutive rows (in this figure three consecutive rows) with both row and frame symmetrization.

FIG. 15 is a diagram showing the principle of time overlap for frame symmetrization, with alternating sign for the row pulse.

In this case, firstly the polarities of the row signal and of the column signal are reversed from image p to the following image p+1. Secondly, the polarities of two successive row signals, and also of two successive column signals are also reversed.

Figure 16:
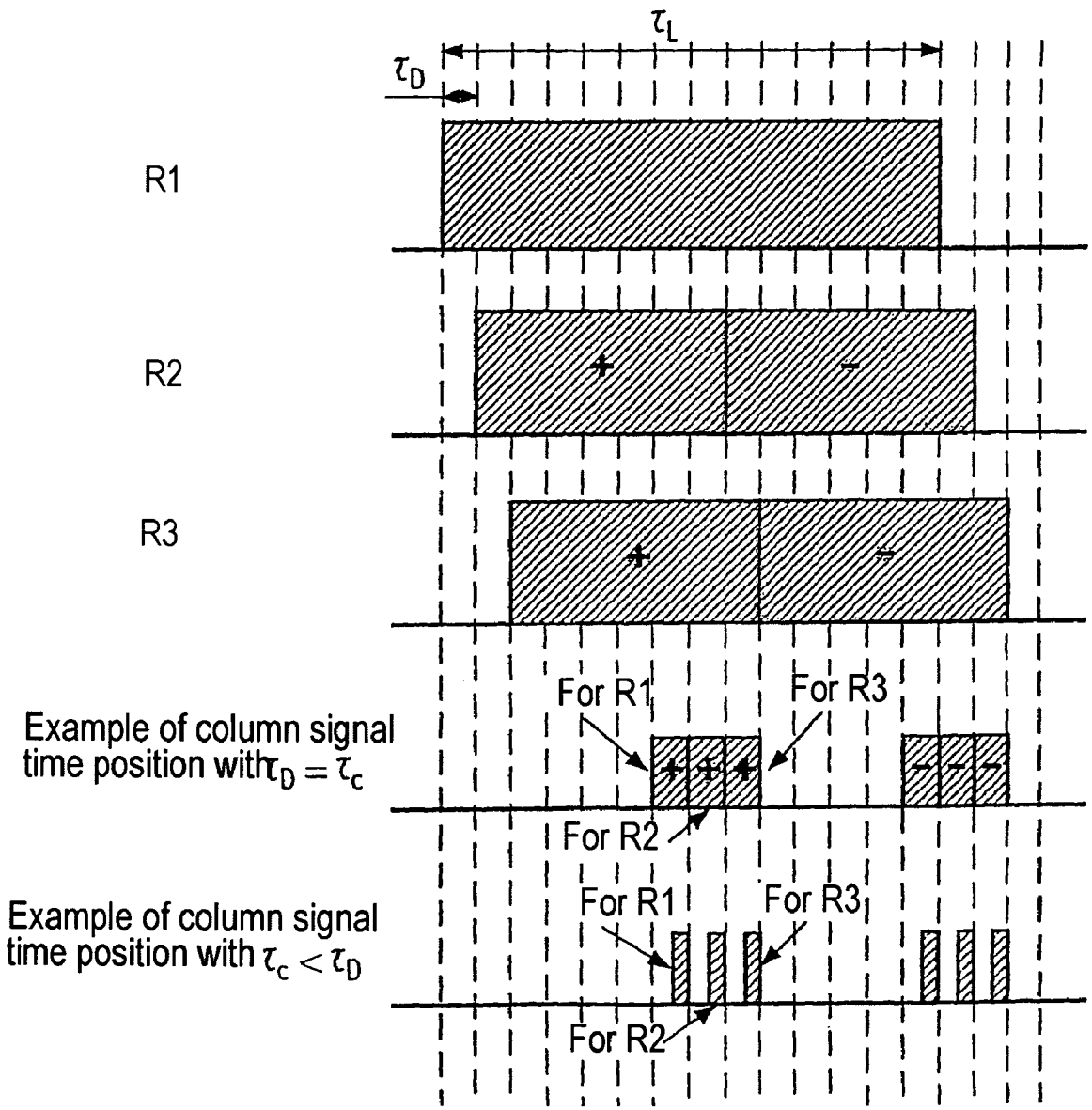
FIG. 16 shows the principle of addressing a BiNem screen by time overlap of the addressing pulses for consecutive rows (in this figure three consecutive rows) with total row symmetrization.

FIG. 16 is a diagram showing the principle of total row symmetrization.

In this case, each row signal comprises two successive adjacent sequences of equal duration, presenting respective opposite polarities, and the column signal is split into two sequences whose ends are synchronized with the ends respectively of the first sequence and of the second sequence of the associated row signal, the polarities of the two column signal sequences likewise being reversed.

Figure 17:
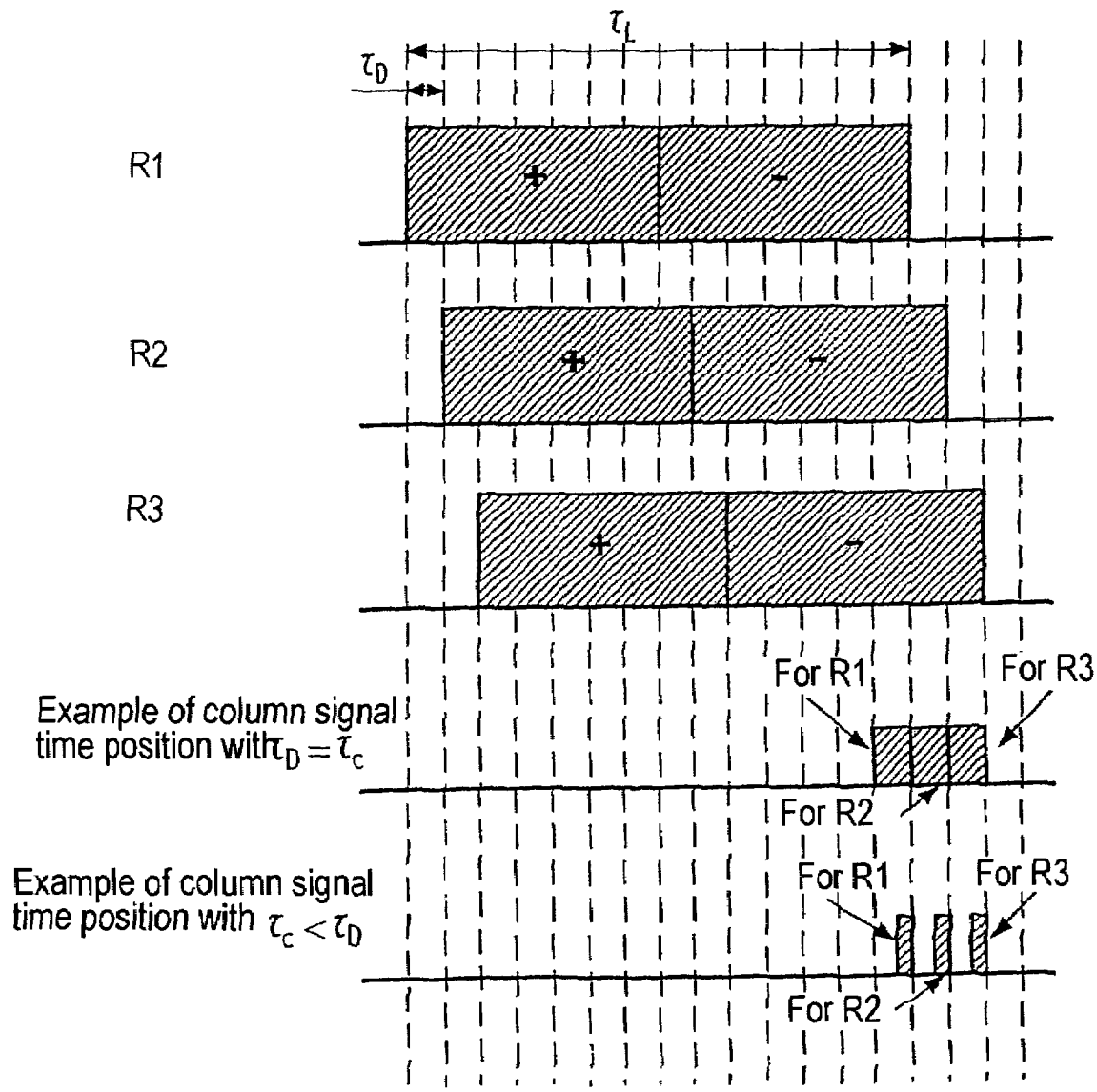
FIG. 17 shows the principle of addressing a BiNem screen by time overlap of the addressing pulses for consecutive rows (in this figure three consecutive rows) with partial row symmetrization.

FIG. 17 is a diagram showing the principle for partial row symmetrization.

Under such circumstances, each row signal comprises two successive adjacent sequences of equal duration, presenting respective opposite polarities, and the end of the column signal is synchronized on the end of the second associated row signal sequence.

In general, all of the above-mentioned variations of symmetrization, whether they apply to frame symmetrization or to row symmetrization, can relate either to symmetrizing row signals and column signals, or to symmetrizing row signals alone.

Drawback of Variant 1: Limit on the Number of Consecutive Rows that can be Addressed Simultaneously When a row is addressed, during the addressing time, nearly all of the molecules are tilted into the homeotropic state, and the light transmission of the row is disturbed. When addressing one row at a time, if the size of the row is smaller than the resolution of the eye, then the observer will not be inconvenienced. However, if a plurality of consecutive rows are addressed and therefore disturbed, a larger zone will be optically disturbed and will become visible and thus disturbing for an observer.

Variant 2: Offsetting a Plurality of Non-Consecutive Rows

In order to overcome the visible disturbance due to disturbing a plurality of consecutive rows simultaneously (a traveling bar of size much greater than the width of one row), it can be advantageous to space apart the rows which are addressed with time overlap.

Figure 18:
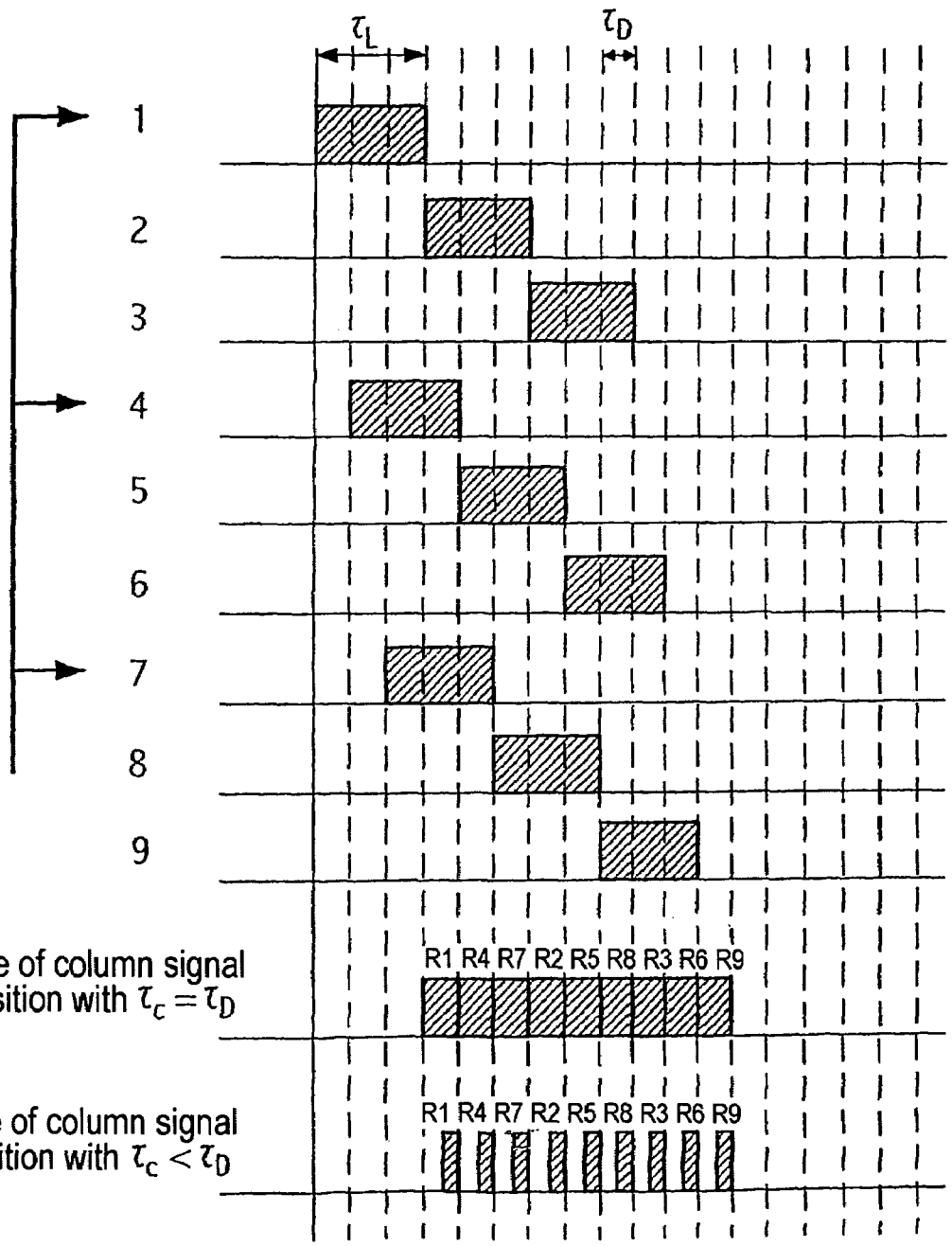
FIG. 18 shows the principle of addressing a BiNem screen by time overlap of the addressing pulses for non-consecutive rows.

The timing diagram of FIG. 18 shows this mode of addressing in an addressing example that possesses a time offset of one-third of the row signal duration $\tau_L$: $\tau_L=3\tau_D$. In this example, the maximum number of rows that can be addressed simultaneously is equal to three.

The same symmetrization options as for consecutive rows can be selected.

More precisely, and in general, in the context of the present invention, it is possible to make provision for addressing simultaneously i modulo j rows, i.e. rows i, i+j, i+2j, etc., by providing a row signal of duration $\tau_L=j\tau_D$, with a time offset $\tau_D$ between two successive row signals applied simultaneously and with an offset $\tau_L$ between successive blocks of row signals applied simultaneously.

The row signals and the column signals corresponding to the blocks are shaded in FIGS. 13 to 18 and can be implemented in a wide variety of ways.

Some of them are described below in non-limiting manner.

The row and column pulses may in particular comply with the waveforms described below.

During the anchoring breaking stage C, voltage is applied to the row signal only.

The duration of the selection stage S is equal to the duration of the column pulse.

Column Pulses

The waveform of these pulses may correspond to each of the examples described in the prior art or to a combination of these examples:

column signal duration less than or equal to the duration of the last plateau of the row signal;

column signal of arbitrary waveform: square, ramp, staircase, etc.;

column signal of duration $\tau_c$ equal to $\tau_D$;

column signal of duration $\tau_c$ less than $\tau_D$.

Row Pulse

Two-plateau row signal

Figure 19:
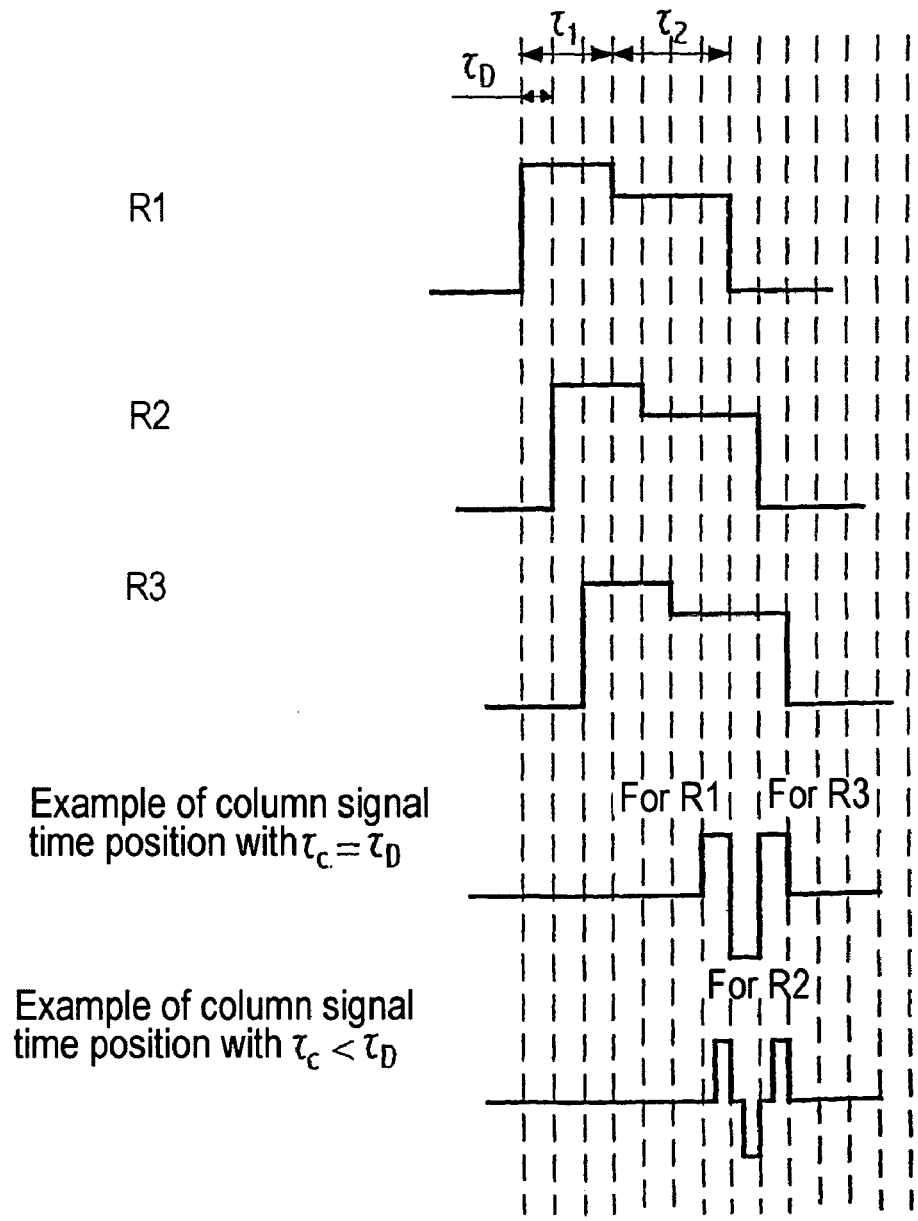
FIG. 19 shows the principle of addressing a BiNem screen by time overlap of the addressing pulses for consecutive rows, with a two-plateau row signal and a column signal with square waveform.

FIG. 19 shows an example of BiNem screen addressing with time overlap of row addressing pulses using Variant 1 (consecutive rows) with a two-plateau row signal and a square waveform column signal of duration shorter than the second plateau of the row signal.

Figure 20:
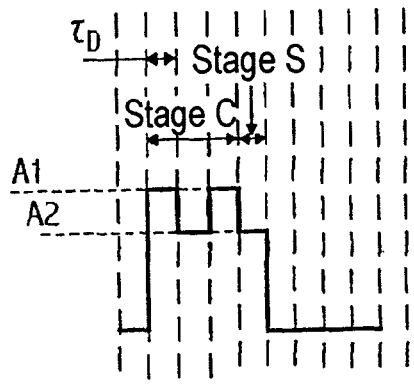
FIG. 20 shows an example of a row pulse waveform for addressing a BiNem screen with time overlap of addressing pulses for rows using a three-plateau row signal during stage C for breaking anchoring.
Figure 21:
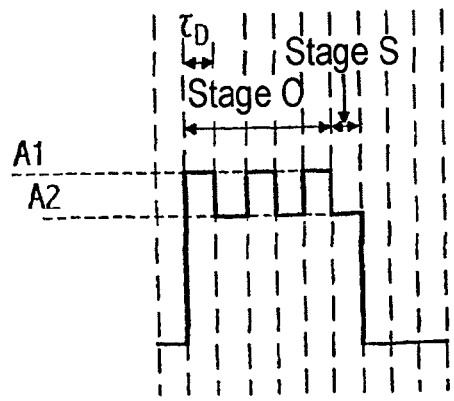
FIG. 21 shows an example of a row pulse waveform for addressing a BiNem screen by time overlap of row addressing pulses using a row signal having five plateaus during stage C of breaking anchoring.

Multi-plateau row signal during stage C, with at least one voltage enabling anchoring to be broken (A1 as defined in the prior art). The voltage level of stage C is equal to A2 as defined in the prior art. A three-plateau example is given in FIG. 20 and a five-plateau example is given in FIG. 21.

In these two examples, the row driver need generate only two voltage levels: a non-selection level and a selection level modulated alternately between A1 and A2. This corresponds to the simplest possible structure for a row driver. Naturally, it is possible to devise solutions using a row driver that is capable of generating a larger number of voltage levels. The row signal can then have a waveform that is more complex, but it must nevertheless comply with the constraints for breaking anchoring (stage C) and for selecting texture (stage S).

A multi-plateau row signal during stage S, with at least one drop at the end enabling texture to be selected.

Naturally, the present invention is not limited to the particular embodiments described above, but extends to all variants within its spirit.

The invention claimed is:

1. A method of electrically addressing a matrix screen of bistable nematic liquid crystals with breaking of anchoring, the method comprising applying controlled electrical signals respectively to row electrodes and to column electrodes of the screen, and further comprising simultaneously addressing a plurality of rows using similar row signals that are offset in time by a duration greater than or equal to the time column voltages, said row addressing signals comprising in a first period at least one voltage value serving to break the anchoring of all of the pixels in the row, followed by a second period enabling the final states of the pixels making up the address row to be determined, said final states being a function of the value of each of the electrical signals applied to the corresponding columns wherein the screen uses two textures, one texture being uniform or lightly twisted in which the molecules are at least substantially parallel to one another, and the other texture differing from the first by a twist of the order of ±180° and wherein $$\tau_c \leq \tau_D < \tau_L$$

in which relationship:

$\tau_D$ represents the time offset between two row signals;

$\tau_L$ represents the row addressing time comprising at least an anchoring breaking stage and a texture selection stage; and $\tau_c$ represents the duration of a column signal.

2. A method according to claim 1, wherein the ends of the column signals are synchronized with the ends of the row signals.

3. A method according to claim 1, wherein the time for addressing x simultaneously addressed rows is equal to $$\tau_L + [\tau_D(x-1)]$$

in which relationship:

$\tau_D$ represents the time offset between two row signals; and $\tau_L$ represents the row addressing time including at least an anchoring breaking stage and a texture selection stage.

4. A method according claim 1, wherein the rows addressed simultaneously in time overlap are adjacent rows.

5. A method according to claim 1, wherein the rows addressed simultaneously in time overlap are rows that are spaced apart.

6. A method according to claim 5, further comprising simultaneously addressing i modulo j rows, i.e. rows i, i+j, i+2j, etc., by providing a row signal of duration $\tau_L=J\tau_D$, by offsetting two successive simultaneously applied row signals in time by $\tau_D$, and by offsetting the successive blocks of simultaneously applied row signals by $\tau_L$.

7. A method according to claim 1, wherein parameters of the signals applied to the screen column electrodes are adapted to reduce the rms voltage of interfering pixel pulses in order to reduce the interfering optical effects of the addressing.

8. A method according to claim 1, wherein parameters of the signals applied to the screen column electrodes are adapted to reduce the rms voltage of the interfering pixel pulses to a value of less than the Freedericksz voltage, so as to reduce the interfering optical effects of the addressing.

9. A method according to claim 8, wherein the parameters adapted to the electrical signal are selected from the group consisting of the waveform, the duration, and the amplitude of the column signal.

10. A method according to claim 1, wherein a duration of the column signal is less than the duration of a last plateau of the row pulse.

11. A method according to claim 1, wherein the column signal presents a squarewave shape.

12. A method according claim 1, wherein the column signal presents a ramp shape.

13. A method according to claim 1, wherein x consecutive rows are addressed simultaneously with a time offset $\tau_D$ from one row to the next, the column signals corresponding to each row being sent sequentially once every $\tau_D$, and each row signal having a total duration of not less than $\tau_L=x\tau_D$.

14. A method according to claim 1, wherein a beginning of the row signal for the $(i+x)^{th}$ row is synchronized with an end of the row signal for the $i^{th}$ row.

15. A method according to claim 1, wherein the row signals do not present any symmetrization.

16. A method according to claim 1, wherein the signals present frame symmetrization.

17. A method according to claim 16, wherein polarities of the row signals are reversed from one image p to the following image p+1.

18. A method according to claim 16, wherein polarities of the row signals and polarities of the column signals are reversed from one image p to the following image p+1.

19. A method according to claim 16, wherein polarities of two successive row signals are reversed.

20. A method according to claim 16, wherein polarities of two successive row signals, and also of two successive column signals are reversed.

21. A method according to claim 15, wherein the number of rows addressed simultaneously is not less than:

$$x_{opt}=\text{integer portion }[\tau_L/\tau_D]$$

in which relationship:

$\tau_D$ represents the time offset between row signals; and $\tau_L$ represents the row addressing time comprising at least an anchoring breaking stage and a texture selection stage.

22. A method according to claim 1, wherein the signals present row symmetrization.

23. A method according to claim 22, wherein each row signal comprises two successive adjacent sequences presenting respective opposite polarities.

24. A method according to claim 22, wherein the column signal is split into two sequences whose ends are synchronized respectively with the end of the first sequence and with the end of the second sequence of the associated row signal, polarities of the two column signal sequences being likewise reversed.

25. A method according to claim 22, wherein the end of the column signal is synchronized with the end of the second sequence of the associated row signal.

26. A method according to claim 22, wherein the polarities of two successive row signals are reversed.

27. A method according to claim 22, wherein the polarities of two successive row signals and also of two successive column signals are reversed.

28. A method according to claim 22, wherein the number of rows addressed simultaneously is not less than:

$$x_{opt} = \text{integer portion } [2\tau_L/\tau_D]$$

in which relationship:

$\tau_D$ represents the time offset between two row signals; and $\tau_L$ represents the row addressing time comprising at least an anchoring breaking stage and a texture selection stage.

29. A method according to claim 1, wherein the column signal is selected from the group comprising: a column signal of duration less than or equal to the duration of the last plateau of the row signal; a column signal of duration $\tau_c$ equal to $\tau_D$; and a column signal of duration $\tau_c$ less than $\tau_D$, where $\tau_D$ represents the time offset between two row signals, while $\tau_c$ represents the duration of a column signal.

30. A method according to claim 1, wherein the row signal is a two-plateau signal: a plateau during the anchoring breaking stage; and a plateau during a texture selection stage.

31. A method according to claim 1, wherein the row signal is a multi-plateau signal during the anchoring breaking stage.

32. A method according to claim 1, wherein the row signal is a multi-plateau signal during a texture selection stage.

33. A device for electrically addressing a matrix screen having a bistable nematic liquid crystal with breaking of anchoring, the device comprising means suitable for applying controlled electrical signals respectively to the row electrodes and to the column electrodes of the screen, and further comprising the means suitable for simultaneously addressing a plurality of rows using similar row signals that are offset in time by a duration greater than or equal to the time column voltages are applied, said row addressing signals comprising in a first period at least one voltage value serving to break the anchoring of all of the pixels in the row, followed by a second period enabling the final states of the pixels making up the address row to be determined, said final states being a function of the value of each of the electrical signals applied to the corresponding columns wherein the screen uses two textures, one texture being uniform or lightly twisted in which the molecules are at least substantially parallel to one another, and the other texture differing from the first by a twist of the order of ±180° and wherein $$\tau_c \leq \tau_D < \tau_L$$

in which relationship:

$\tau_D$ represents the time offset between two row signals;

$\tau_L$ represents the row addressing time comprising at least an anchoring breaking stage and a texture selection stage; and $\tau_c$ represents the duration of a column signal.

34. A device according to claim 33, wherein the ends of the column signals are synchronized with the ends of the row signals.

35. A device according to claim 33, wherein the time for addressing x simultaneously addressed rows is equal to $$\tau_L + [\tau_D(x-1)]$$

in which relationship:

$\tau_D$ represents the time offset between two row signals; and $\tau_L$ represents the row addressing time including at least an anchoring breaking stage and a texture selection stage.

36. A device according claim 33, wherein the rows addressed simultaneously in time overlap are adjacent rows.

37. A device according to claim 33, wherein the rows addressed simultaneously in time overlap are rows that are spaced apart.

38. A device according to claim 37, further including means for simultaneously addressing i modulo j rows, i.e. rows i, i+j, i+2j, etc., by providing a row signal of duration $\tau_L = j\tau_D$, by offsetting two successive simultaneously applied row signals in time by $\tau_D$, and by offsetting the successive blocks of simultaneously applied row signals by $\tau_L$.

39. A device according to claim 33, wherein parameters of the signals applied to the screen column electrodes are adapted to reduce the rms voltage of interfering pixel pulses in order to reduce interfering optical effects of the addressing.

40. A device according to claim 33, wherein parameters of the signals applied to the screen column electrodes are adapted to reduce the rms voltage of the interfering pixel pulses to a value of less than the Freedericksz voltage, so as to reduce interfering optical effects of the addressing.

41. A device according to claim 40, wherein the parameters adapted to the electrical signal are selected from the group consisting of: the waveform, the duration, and the amplitude of the column signal.

42. A device according to claim 33, wherein a duration of the column signal is less than a duration of a last plateau of the row pulse.

43. A device according to claim 33, wherein the column signal presents a squarewave shape.

44. A device according to claim 33, wherein the column signal presents a ramp shape.

45. A device according to claim 33, wherein x consecutive rows are addressed simultaneously with a time offset $\tau_D$ from one row to the next, the column signals corresponding to each row being sent sequentially once every $\tau_D$, and each row signal having a total duration of not less than $\tau_L = x\tau_D$.

46. A device according to claim 33, wherein a beginning of the row signal for the $(i+x)^{th}$ row is synchronized with an end of the row signal for the $i^{th}$ row.

47. A device according to claim 33, wherein the row signals do not present any symmetrization.

48. A device according to claim 33, wherein the signals present frame symmetrization.

49. A device according to claim 48, wherein polarities of the row signals are reversed from one image p to the following image p+1.

50. A device according to claim 48, wherein the polarities of the row signals and polarities of the column signals are reversed from one image p to the following image p+1.

51. A device according to claim 48, wherein polarities of two successive row signals are reversed.

52. A device according to claim 48, wherein polarities of two successive row signals, and also of two successive column signals are reversed.

53. A device according to claim 47, wherein the number of rows addressed simultaneously is not less than:

$$x_{opt} = \text{integer portion } [\tau_L/\tau_D]$$

in which relationship:
$\tau_D$ represents the time offset between row signals; and
$\tau_L$ represents the row addressing time comprising at least an anchoring breaking stage and a texture selection stage.

54. A device according to claim 33, wherein the signals present row symmetrization.

55. A device according to claim 54, wherein each row signal comprises two successive adjacent sequences presenting respective opposite polarities.

56. A device according to claim 54, wherein the column signal is split into two sequences whose ends are synchronized respectively with the end of the first sequence and with the end of the second sequence of the associated row signal, polarities of the two column signal sequences being likewise reversed.

57. A device according to claim 54, wherein an end of the column signal is synchronized on an end of the second sequence of the associated row signal.

58. A device according to claim 54, wherein polarities of two successive row signals are reversed.

59. A device according claim 54, wherein polarities of two successive row signals and also of two successive column signals are reversed.

60. A device according to claim 54, wherein the number of rows addressed simultaneously is not less than:

$$x_{opt} = \text{integer portion } [2\tau_L/\tau_D]$$

in which relationship:
$\tau_D$ represents the time offset between two row signals; and
$\tau_L$ represents the row addressing time comprising at least an anchoring breaking stage and a texture selection stage.

61. A device according to claim 33, wherein the column signal is selected from the group comprising: a column signal of duration less than or equal to the duration of the last plateau of the row signal; a column signal of duration $\tau_c$ equal to $\tau_D$; and a column signal of duration $\tau_c$ less than $\tau_D$, where $\tau_D$ represents the time offset between two row signals, while $\tau_c$ represents the duration of a column signal.

62. A device according to claim 33, wherein the row signal is a two-plateau signal: a plateau during the anchoring breaking stage and a plateau during a texture selection stage.

63. A device according to claim 33, wherein the row signal is a multi-plateau signal during the anchoring breaking stage.

64. A device according to claim 33, wherein the row signal is a multi-plateau signal during the texture selection stage.

* * * * *

UNITED STATES PATENT AND TRADEMARK OFFICE
CERTIFICATE OF CORRECTION

PATENT NO. : 7,352,346 B2
APPLICATION NO. : 10/511833
DATED : April 1, 2008
INVENTOR(S) : Jacques Angele, Romain Vercelletto and Thierry Elbhar It is certified that error appears in the above-identified patent and that said Letters Patent is hereby corrected as shown below:

Column 19, line 59, delete the word --are--.
Column 20, line 23, after "according" insert --to--.
Column 21, line 6, first occurrence of "p" should read --p--.
Column 21, line 11, after "signals," insert a comma --,--.
Column 22, line 3, after "according" insert --to--.

Signed and Sealed this

Eighth Day of July, 2008

JON W. DUDAS
*Director of the United States Patent and Trademark Office*